United States Patent

Mishima et al.

[11] Patent Number: 5,825,419
[45] Date of Patent: *Oct. 20, 1998

[54] CODING DEVICE AND DECODING DEVICE OF DIGITAL IMAGE SIGNAL

[75] Inventors: Hidetoshi Mishima; Yoshiko Hatano; Yoshinori Asamura, all of Tokyo, Japan

[73] Assignee: Mitsubishi Denki Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 723,950

[22] Filed: Sep. 26, 1996

[30] Foreign Application Priority Data

Sep. 29, 1995 [JP] Japan .................................... 7-252992

[51] Int. Cl.$^6$ ............................ H04N 7/12; H04N 11/02; H04N 11/04

[52] U.S. Cl. ........................... 348/402; 348/416; 348/420

[58] Field of Search ..................................... 348/404, 405, 348/409, 420, 421, 423, 384, 390, 402, 416; H04N 7/02, 11/02, 11/04

[56] References Cited

U.S. PATENT DOCUMENTS

| | | | |
|---|---|---|---|
| 4,677,479 | 6/1987 | Hatori et al. | 358/135 |
| 4,710,811 | 12/1987 | Kondo | 358/135 |
| 4,890,161 | 12/1989 | Kondo | 358/135 |
| 5,184,229 | 2/1993 | Saito et al. | 358/427 |
| 5,500,673 | 3/1996 | Thon | 348/156 |
| 5,510,840 | 4/1996 | Yonemitsu et al. | 348/402 |
| 5,535,137 | 7/1996 | Rossmere et al. | 364/514 |
| 5,555,321 | 9/1996 | Ogura et al. | 382/235 |
| 5,563,649 | 10/1996 | Gould et al. | 348/17 |
| 5,577,191 | 11/1996 | Bonomi | 395/502 |
| 5,617,142 | 4/1997 | Hamilton | 348/405 |
| 5,627,601 | 5/1997 | Ran et al. | 348/402 |

FOREIGN PATENT DOCUMENTS

| | | |
|---|---|---|
| 4-318791 | 11/1992 | Japan . |
| 5-041862 | 2/1993 | Japan . |
| 5-103312 | 4/1993 | Japan . |

*Primary Examiner*—Tommy P. Chin
*Assistant Examiner*—Nhon T. Diep

[57] ABSTRACT

A coding device of a digital image signal coding highly efficiently a digital image signal by using a bidirectional motion compensating prediction and a DCT (digital cosine transform) transformation thereby compressing information, including inputting reference images for coding images for a bidirectional prediction to a spatial region as data and blocking the data, coding the blocked data, writing the coded data to a memory, reading reference regions for calculating a motion vector for prediction or data of the reference regions for calculating a prediction value from the memory, decoding the read data, and calculating the motion vector or means for calculating the prediction value by using the decoded data.

19 Claims, 12 Drawing Sheets

AVERAGING CIRCUIT: USED FOR INTERPOLATIVE PREDICTION

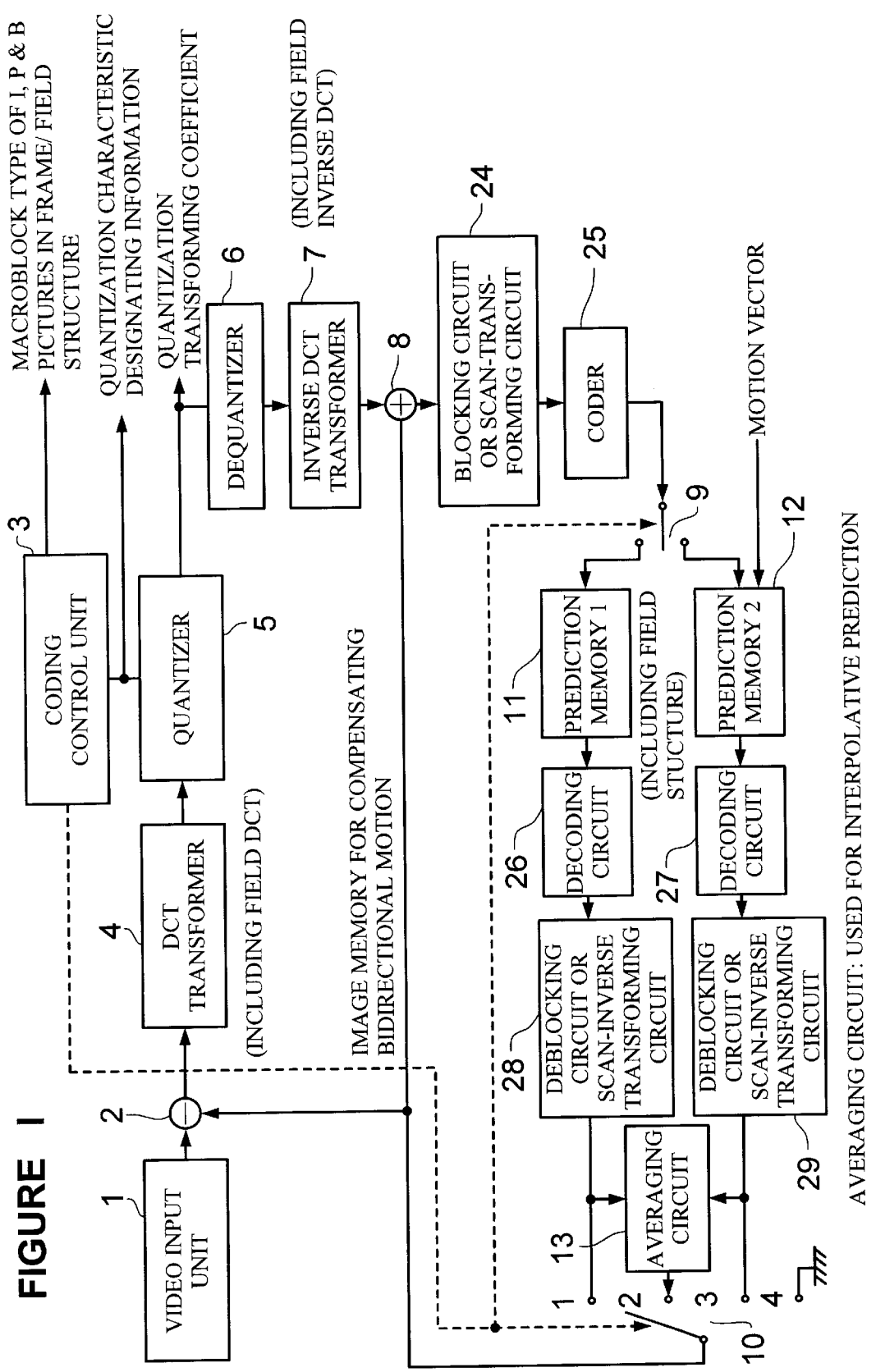

FIGURE 2(A)
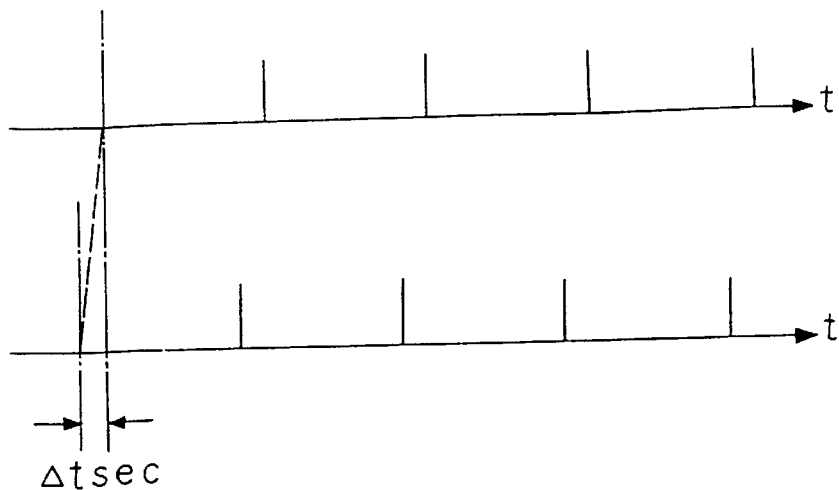
FIGURE 2(B)
FIGURE 3
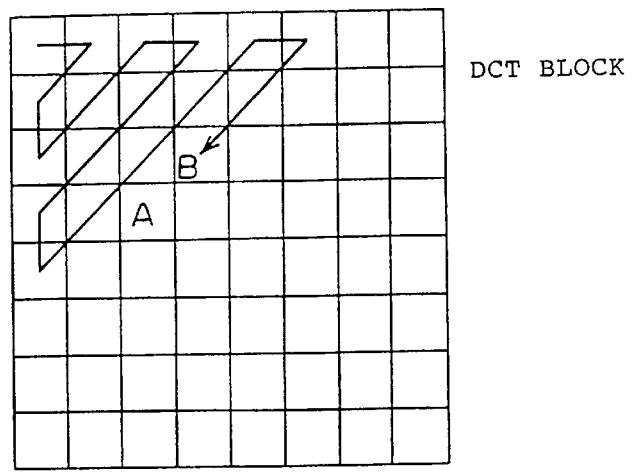
FIGURE 4
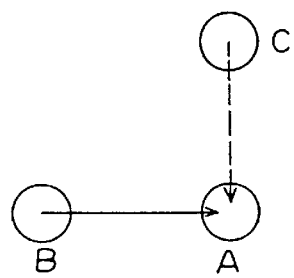

PTS: PRESENTATION TIME STAMP, TIME CONTROL INFORMATION OF REPRODUCING OUTPUT
DTS: DECODING TIME STAMP, TIME CONTROL INFORMATION OF DECODING

CODING DEVICE AND DECODING DEVICE OF DIGITAL IMAGE SIGNAL

BACKGROUND OF THE INVENTION

1. Field of the Invention

The present invention relates to a coding device and a decoding device of a digital image signal.

2. Discussion of the Background

FIG. 12 is a block diagram of a coder with respect to an image signal portion in coding an information source in MPEG (Moving Picture Experts Group) 1 described on page 105 of "Pointwisely illustrated Newest MPEG Textbook" supervised by Hiroshi Fujiwara, edited by the "Multimedia Communication Research Association" and issued by ASCII Corporation on Aug. 1, 1994.

In FIG. 12, numeral 1 designates a video input unit, numeral 2 designates a difference former, numeral 3 designates a coding control unit, numeral 4 designates a DCT (Discrete Cosine Transform) transformer, numeral 5 designates a quantizer, numeral 6 designates a dequantizer, numeral 7 designates an inverse DCT transformer, numeral 8 designates an adder, numerals 9 and 10 designate switches, numerals 11 and 12 designate prediction memories and numeral 13 designates an averaging circuit.

Next, an explanation will be given of the operation. An image signal is provided from the video input unit 1 and the signal is coded in accordance with the standards of MPEG. There is adopted in MPEG 1 discrete cosine transform (hereinafter "DCT") as a high efficiency coding method utilizing spatial correlation and bidirectional motion compensating interframe prediction as a means for utilizing temporal correlation. The DCT calculation is carried out by the DCT transformer 4. Image data at a position where the motion is compensated is read from the prediction memory 11 or the prediction memory 12 and a difference is calculated at the difference former 2. Further, the data is transformed into data in frequencies by the DCT transformer 4 and thereafter, quantization allocating quantization levels corresponding to approximated representative values with respect to the result of calculation by the DCT transformer is carried out by the quantizer 5. Although not expressed in FIG. 12, information of a motion vector, a macroblock type, quantization designating information and quantization transforming coefficient is compressed by using variable code length formation allocating a code length in accordance with the frequency of occurrence of data.

The quantization transforming coefficient outputted from the quantizer 5 is transformed into a representative value by the dequantizer 6 while it is formed into a variable length code. By restoring the result to data in the spatial region by the inverse DCT transformer 7 it is restored to have a value proximate to that of data before inputting it to the DCT transformer 4. The data which has been subjected to the inverse DCT formation, is added to image data at a position where the motion is compensated, which is read from the prediction memory 11 or the prediction memory 12. This addition is carried out by the adder 8. In this way the data is restored to the data in the spatial region where the motion compensating prediction is restored to an original state and therefore, the data can be used in the next prediction.

The averaging circuit 13 is a circuit averaging with rounding a prediction temporally in the forward direction and a prediction temporally in the backward direction between corresponding pixels. The switch 10 is controlled to switch in accordance with the prediction mode or a storage state of the memory 11 or 12. This control is governed by the coding control unit 3.

An image information for predicting a temporally coded frame from future and an image information for predicting it from past are stored in the two prediction memories 11 and 12 and the coder's side switches to use them. There are two prediction modes, namely, the intra mode which does not use temporally preceding and succeeding frames and the MC (motion compensating) mode. According to the MC mode either of the predictions of the two prediction memories 11 and 12 or an average of the both predictions can be utilized.

To realize the bidirectional prediction, according to the MPEG, images are provided with I picture (Intra-Picture), P picture (Predictive-Picture) and B picture (Bidirectionally predictive-Picture). I picture is referred to as a frame that is formed without using interframe prediction among an aggregation of dynamic images (hereinafter "GOP" (Group of Pictures)) and a minimum of one picture is necessary in one GOP. P picture is an image formed by conducting prediction from I or P picture in which the prediction in the forward direction is used. In this picture the intra mode where the pattern of the macroblock does not use prediction can be mixed. B picture is in a form mixed with an average of prediction in both directions of the prediction only in the forward direction and the prediction only in the backward direction, and the intra mode.

The relation among the respective pictures is normally under a constant relationship. That is, the interval between I pictures is equal to the interval between GOPs and B pictures are inserted between I picture and P picture and this relationship normally remains unchanged in the midst of coding. FIG. 13 is a diagram showing this relationship.

Original image is inputted from the video input unit 1 and normally, an aggregation of 15 frames of dynamic images is often coded. In this case GOP is constituted by a unit of 15 frames and I picture is often allocated at a third frame in GOP. At the start of coding, with respect to B pictures at initial two frames in front of I picture, although the prediction in the backward direction is conducted, in the midst of coding the bidirectional prediction from the last one of P picture in the preceding GOP and the I picture in the current GOP can be carried out.

Also, according to FIG. 13, two frames of B pictures are inserted between I picture and P picture.

It is necessary to code and output frames by rearranging the order of the frames due to the presence of B frames. Once I pictures or the P pictures are coded, they are immediately output. However, with regard to B pictures, coded data is stored and is outputted after I pictures or P pictures have been outputted. That is, it is determined that the data is outputted in an order specified in the data at a stage of coding in FIG. 13.

Therefore, it is necessary that the data which has been quantized once in the frequency region of DCT, is restored to data in the original spatial region and further to a data where the motion compensating prediction is restored and a memory of two frames of the bidirectional prediction is provided. The prediction memories 11 and 12 are prepared for this purpose.

However, the prediction memories 11 and 12 must store a large amount of data of 8M bits in the case of NTSC (National Television System Committee) system, since the number of pixels is 720×480 pixels per frame, one pixel is constituted by 8 bits and the brightness signal and the color signal are included. It is difficult to mount such a large memory on a single LSI and even if a DRAM etc. is provided in addition thereto, its capacity is large, giving rise to an increase in cost.

The coded portion of the information source of the image signal is multiplexed along with a coded output of an audio signal through formation of a variable length code and is sent to a transmitting path. FIG. 14 illustrates this procedure. The demultiplexing of image data and audio data is conducted via the transmitting path, the respective data are decoded and the image data and the audio data are enjoyed by viewers through monitors or speakers, respectively.

Further, with regard to the transmitting path the data is transmitted by radio wave through air as shown by FIG. 15, or transmitted by cables or transmitted by stored media. The data is subjected to communication path coding in a form in compliance with the transmitting path. For example, the data is transmitted via a signal processing such as error correction or digital modulation.

Next, an explanation will be given of the side of decoding. FIG. 16 is a block diagram of a decoder for an image signal portion in coding an information source of MPEG 1 described on page 105 of "Pointwisely Illustrated Newest MPEG Text Book" supervised by Hiroshi Fujiwara, edited by the "Multimedia Communication Research Association" and issued by ASCII Corporation on Aug. 1, 1994.

In FIG. 16 numeral 14 designates a dequantizer, numeral 15 designates an inverse DCT transformer, numeral 16 designates an adder, numerals 17, 21 and 22 designate switches, numerals 18 and 19 designate prediction memories, numeral 20 designates an averaging circuit and numeral 23 designates a monitor.

Next, an explanation will be given of the operation. The data which has been subjected to the operation of coding image information source and subjected to the operation of coding in respect of a communication path and transmitted, is subjected to the operation of decoding in respect of the communication path. Only image data thereof is extracted and the variable length code is decoded and the data is inputted to the decoder as data of which quantization characteristic designating information, macroblock type, motion vector and quantization transforming coefficient have been extracted. The dequantizer 14 dequantizes the data from the quantization characteristic designating information and the quantization transforming coefficient to transform them into representative values in the frequency region of DCT and the inverse DCT transformer 15 restores the data to the data in the spatial region. Based on the data in the spatial region and the motion vector, necessary portions of the data of preceding and succeeding frames are read from the prediction memory 18 and the prediction memory 19 in a compensated form by shifting them by the amount of motion and are added to the data in the spatial region by the adder 16. This operation corresponds to decoding a difference value from a prediction value and at this stage the decoding of the motion compensating prediction and the DCT transformation is completed.

At this occasion, the switches 21 and 22 are controlled based on the information of the macroblock type. The macroblock type is referred to as a mode type permitted to each macroblock which has been explained in the above-mentioned picture type. The averaging circuit 20 is a circuit for calculating an average value with rounding of the prediction in the forward direction and the prediction in the backward direction as a result of the bidirectional prediction with respect to one macroblock type of B picture in the macroblock types.

There is an agreement that the order of frames is rearranged also on the side of decoding to carry out the coding and decoding in such a way. This procedure is indicated by FIG. 13. The stage of decoding in FIG. 13 indicates the input order of the decoder in FIG. 16. B picture in the data is outputted immediately after decoding. However, I picture or B picture is outputted after outputting B picture. Therefore, it is necessary to hold the once decoded I picture and P picture in the memories 18 and 19 until B pictures therebetween have been decoded.

For that purpose, in the case of, for example, NTSC (National Television System Committee) signal, a large amount of data of 8M bits must be stored since the number of pixels is 720×480 pixels per frame, one pixel is constituted by 8 bits and the brightness signal and the color signal are also included. However, it is difficult to mount such a large memory on a single LSI and even if a DRAM etc. is provided in addition thereto, the capacity thereof is large, giving rise to an increase in cost.

Further, it is necessary that the time axis of the image data is brought into alignment with the time axis of the audio data. Otherwise, if the times of the two signals are shifted from each other in the process of coding and decoding, there is no mechanism of adjusting the shift. Therefore, it is prescribed that time information is multiplexed to each data at a multiplexing unit in FIG. 14. FIG. 17 is a diagram showing a region for inserting the time information therefor.

FIG. 17 is a diagram showing a bit stream format of PES (Packetized Elementary Stream). As illustrated in the diagram the video or audio signal is processed into a packet referred to as PES and it is prescribed that time information that is referred to as time stamp is multiplexed at that time. Two time stamps of presentation time stamp and decoding time stamp are prepared in order to be able to deal with rearrangement of frame order in carrying out the bidirectional prediction of MPEG. The presentation time is represented by PTS (Presentation time Stamp) and the decoding time is represented by DTS (Decoding Time Stamp). Synchronization is conducted by using these time information.

Therefore, when some processing is inserted in addition to the normal processing, there causes contradiction in such a time control and the synchronizing relationship collapses.

As stated above, when coding is carried out by using the motion compensating prediction and the DCT transformation, an enormous amount of memory is required for prediction, resulting in high cost. Also, it is difficult in respect of scale and capacity to mount the memory on a single chip of a semiconductor.

In addition thereto, when decoding is carried out by using the motion compensating prediction and the DCT transformation, an enormous amount of memory is required for prediction, resulting in high cost. Also, it is difficult in respect of scale and capacity to mount the memory on a single chip of a semiconductor.

If some processing is tried to save the memory, time is shifted and times of audio and image data are shifted from each other.

SUMMARY OF THE INVENTION

The present invention has been carried out in view of the above-described problems and it is an object of the present invention to provide a coding and/or decoding device capable of restraining as small as possible the capacity of a memory that is used in coding and decoding an image signal. It is another object of the present invention to provide a coding and/or decoding device capable of restraining a shift between times of audio and image signals.

According to a first aspect of the present invention, there is provided a coding device of a digital image signal coding highly efficiently a digital image signal by using a bidirectional motion compensating prediction and a DCT (digital cosine transform) transformation thereby compressing information, said coding device comprising:

means for inputting reference images for coding images for a bidirectional prediction to a spatial region as data and blocking the data;

means for coding the blocked data;

means for writing the coded data to a memory;

means for reading reference regions for calculating a motion vector for prediction or data of the reference regions for calculating a prediction value from the memory;

means for decoding the read data; and means for calculating the motion vector or means for calculating the prediction value by using the decoded data.

According to a second aspect of the present invention, there is provided a coding device of a digital image signal coding highly efficiently a digital image signal by using a bidirectional motion compensating prediction and a DCT transformation thereby compressing information, multiplexing in respect of time axes the digital image signal along with compressed data of a digital audio signal and multiplexing and coding respective time axes data of the image signal and the audio signal in multiplexing the digital signals, said coding device comprising:

means for inputting reference images for coding images for a bidirectional prediction to a spatial region as data and blocking the data;

means for coding the blocked data;

means for writing the coded data to a memory;

means for reading reference regions for calculating a motion vector for prediction or data of the reference regions for calculating a prediction value from the memory;

means for decoding the read data;

means for calculating the motion vector or means for calculating the prediction value by using the decoded data; and wherein the means for reading reads the reference regions or the data of the reference regions prior to a predetermined time point by a processing time period to be in alignment with the multiplexed time axes data.

According to a third aspect of the present invention, there is provided a coding device of a digital image signal coding highly efficiently a digital image signal by using a bidirectional motion compensating prediction and a DCT transformation thereby compressing information, said coding device comprising:

means for inputting reference images f or coding images for a bidirectional prediction to a spatial region as data and raster-transforming the data;

means for coding the raster-transformed data;

means for writing the coded data to a memory;

means for reading the reference regions for calculating a motion vector for prediction or data of the reference regions for calculating a prediction value from the memory;

means for decoding the read data; and means for calculating the motion vector or means for calculating the prediction value by using the decoded data.

According to a fourth aspect of the present invention, there is provided a coding device of a digital image signal according to the first aspect, wherein the means for coding the blocked data comprises:

means for calculating the prediction value at least from a contiguous pixel;

means for calculating a difference from the prediction value; and means for quantizing the difference.

According to a fifth aspect of the present invention, there is provided a coding device of a digital image signal according to the first aspect, wherein the means for coding the blocked data comprises:

means for calculating the prediction value at least from a contiguous pixel;

means for calculating a difference from the prediction value; and means for quantizing the difference;

wherein the prediction value is referred to by a spatially proximate contiguous pixel in a same field.

According to a sixth aspect of the present invention, there is provided a coding device of a digital image signal according to the first aspect, wherein the means for coding the blocked data comprises:

means for calculating a dynamic range based on a maximum value and a minimum value of values of pixels in a block;

means for calculating reference values from the dynamic range and means for quantizing the data in accordance with the reference values.

According to a seventh aspect of the present invention, there is provided a coding device of a digital image signal according to the first aspect, wherein the means for decoding the blocked data comprises:

means for calculating quantization reference values from a distribution of values of pixels in a block;

means for coding among the quantization reference values one level thereof;

means for coding a quantization width information; and means for quantizing the data in accordance with the quantization reference values.

According to an eighth aspect of the present invention, there is provided a coding device of a digital image signal according to the sixth aspect, wherein the blocking means blocks the data in a same field in blocking the data.

According to a ninth aspect of the present invention, there is provided a coding device of a digital image signal according to the sixth embodiment, wherein the means for coding the blocked data codes the data such that in quantizing the data by calculating the quantization reference values from the values of the pixels in the block, if an error between a value of the data before quantizing the data and a value thereof quantized and transformed into a representative value is large, the representative value is replaced by a representative value reducing the error.

According to a tenth aspect of the present invention, there is provided a decoding device of a digital image signal decoding an information-compressed data formed by coding highly efficiently a digital image signal by using a bidirectional motion compensating prediction and a DCT transformation, said decoding device comprising:

means for inputting reference images for decoding images for a bidirectional prediction to a spatial region as data and blocking the data;

means for coding the blocked data;

means for writing the coded data to a memory;

means for reading the data from the memory for decoding a difference from a prediction value;

means for decoding the read data; and means for decoding the difference value from the prediction value by using the decoded data.

According to an eleventh aspect of the present invention, there is provided a decoding device of a digital image signal decoding an image signal of data formed by coding highly efficiently a digital image signal by using a bidirectional motion compensating prediction and a DCT transformation thereby compressing information, multiplexing in respect of time axes the digital image signal along with compressed data of a digital audio signal and multiplexing respective time axes data of image and audio signals in multiplexing the digital signals such that the image and the audio signals are synchronized with each other based on the time axes data, said decoding device comprising:

means for inputting reference images for decoding images for a bidirectional prediction to a spatial region as data and blocking the data;

means for coding the blocked data;

means for writing the coded data to a memory;

means for reading the data from the memory to decode a difference value from a prediction value;

means for decoding the read data;

means for decoding the difference value from the prediction value by using the decoded data; and wherein the means for reading the data reads the data prior to a predetermined time point by a processing time period to be in alignment with the multiplexed time axes data.

According to the twelfth aspect of the present invention, there is provided a decoding device of a digital image signal decoding an information-compressed data formed by coding highly efficiently a digital image signal by using a bidirectional motion compensating prediction and a DCT transformation, said decoding device comprising:

means for inputting reference images for decoding images for a bidirectional prediction to a spatial region as data and raster-transforming the data;

means for coding the raster-transformed data;

means for writing the coded data to a memory;

means for reading the data from the memory to decode a difference value from a prediction value;

means for decoding the read data; and means for decoding the difference value from the prediction value by using the decoded data.

According to a thirteenth aspect of the present invention, there is provided a decoding device of a digital image signal according to the tenth aspect, wherein the means for coding the blocked data comprises:

means for calculating the prediction value at least from a contiguous pixel;

means for calculating a difference from the prediction value; and means for quantizing the difference.

According to a fourteenth aspect of the present invention, there is provided a decoding device of a digital image signal according to the tenth aspect, wherein the means for coding the blocked data comprises:

means for calculating the prediction value at least from a contiguous pixel;

means for calculating a difference from the prediction value;

means for quantizing the difference; and wherein the prediction value is referred to by a spatially proximate pixel in a same field.

According to a fifteenth aspect of the present invention, there is provided a decoding device of a digital image signal according to the tenth aspect, wherein the means for coding the blocked data comprises:

means for calculating a dynamic range based on a maximum value and a minimum value of values of pixels in a block;

means for calculating reference values from the dynamic range; and means for quantizing the data in accordance with the reference values.

According to a sixteenth aspect of the present invention, there is provided a decoding device of a digital image signal according to the tenth aspect, wherein the means for coding the blocked data comprises:

means for calculating quantization reference values from a distribution of values of pixels in a block;

means for coding among the quantizing reference values one level thereof;

means for coding a quantization width information; and quantizing the data in accordance with the quantization reference values.

According to a seventeenth aspect of the present invention, there is provided a coding device of a digital image signal according to the fifteenth aspect, wherein the blocking means blocks the data in a same field in blocking the data.

According to an eighteenth aspect of the present invention, there is provided a decoding device of a digital image signal according to the fifteenth aspect, wherein the means for coding the blocked data codes the data such that in quantizing the data by calculating the quantization reference values from the values of the pixels in the block, if an error between a value of the data before quantizing the data and a value thereof quantized and transformed into a representative value is large, the representative value is replaced by a representative value reducing the error.

According to the nineteenth aspect of the present invention, there is provided a coding and decoding device of a digital image signal coding highly efficiently a digital image signal by using a bidirectional motion compensating prediction and a DCT transformation thereby compressing information and transmitting and decoding the coded digital image signal, said coding and decoding device comprising:

means for inputting reference images for coding images for a bidirectional prediction to a spatial region as data and blocking the data;

means for coding the blocked data;

means for writing the coded data to a memory;

means for reading reference regions for calculating a motion vector for prediction or data of the reference regions for calculating a prediction value from the memory;

means for decoding the read data;

means for calculating the motion vector or means for calculating the prediction value by using the decoded data;

means for adding an information indicating a method adopted by the means for coding the blocked data at this time;

means for inputting after transmission reference images for decoding images for the bidirectional prediction to a spatial region as data and blocking the data based on the information indicating the method of coding the blocked data;

means for coding the blocked data;

means for writing the coded data to a memory;

means for reading the data from the memory to decode a difference value from a prediction value;

means for decoding the read data; and means for decoding the difference value from the prediction value by using the decoded data.

According to the coding device of a digital image signal in accordance with the first aspect of the present invention, the reference image data for coding the images for the bidirectional prediction, is blocked in a form similar to that of a DCT block by the blocking means, the coding is carried out highly efficiently in respect of the data in the block whereby the data is written to the memory after minimizing the information to be stored in the memory and in reading the data, the data is referred to after decoding the data.

According to the coding device of a digital image signal in accordance with the second aspect of the present invention, the reference image data for coding the images for the bidirectional prediction, is blocked in a form similar to that of the DCT block by the blocking means, the coding is carried out highly efficiently in respect of the data of the block whereby the data is written to the memory after minimizing the information to be stored in the memory and in reading the data, the data is referred to after decoding the data and further, the coding is carried out such that the time axis of the image signal is brought into alignment with the time axis of the audio signal.

According to the coding device of a digital image signal in accordance with the third aspect of the present invention, the reference image data is transformed into a form similar to a screen input by the raster-transforming means, the coding is carried out highly efficiently in respect of the raster-transformed data and the data is written to the memory after minimizing the information to be stored in the memory and in reading the data, the data is referred to after decoding the data.

According to the coding device of a digital image signal in accordance with the fourth aspect of the present invention, the prediction value from the contiguous pixel is calculated and the difference from the prediction value is calculated whereby the calculation result concentrates in the vicinity of 0. Accordingly, the information to be stored in the memory is reduced with almost no deterioration of image quality even if a coarse quantization is carried out at portions other than the concentrated portion and the scale is significantly reduced.

According to the coding device of a digital image signal in accordance with the fifth aspect of the present invention, the contiguous pixel the location of which is the most proximate to the data in respect of the space and time of the screen, is selected whereby the degree of concentration of the value of the data is enhanced. Accordingly, the degree of deterioration is further lowered and yet the scale remains almost uninreased.

According to the coding device of a digital image signal in accordance with the sixth aspect of the present invention, the data is blocked, the dynamic range is calculated and the quantization is allocated within the range. Therefore, it is possible to set quantization levels dispensing with wasteful quantization out of the dynamic range whereby even if a further coarse quantization is carried out, almost no deterioration of image quality is resulted and accordingly, the information to be stored in the memory is further reduced and yet the scale remains almost unincreased.

According to the coding device of a digital image signal in accordance with the seventh aspect of the present invention, the data is blocked, the quantization is allocated according to the distribution of the data and therefore, it is possible to set quantization levels which are not affected by noise, resulting in no deterioration of image quality in respect of noise. Further, it is possible to set the quantization levels dispensing with wasteful quantization out of the distribution whereby even if a coarse quantization is carried out, almost no deterioration of image quality is resulted.

According to the coding device of a digital image signal in accordance with the eighth aspect of the present invention, the blocks are selected such that the blocks are the most proximate to each other in respect of the space within the same time period of the screen whereby the degree of concentration of the value of the data is enhanced and accordingly, the degree of deterioration of image quality is further reduced and yet the scale remains almost unincreased.

According to the coding device of a digital image signal in accordance with the ninth aspect of the present invention, the quantization levels enlarging the error are calculated and the representative values are coded whereby the error of quantization is made extremely small even if the data is decoded.

According to the decoder of a digital image signal in accordance with the tenth aspect of the present invention, the reference image data for coding the images for the bidirectional prediction, is blocked in a form similar to that of the DCT block by the blocking means, the coding is carried out highly efficiently in respect of the data of the block and the reference of the data is carried out by decoding the data in writing and reading the data to and from the memory after minimizing the information to be stored in the memory.

According to the decoding device of a digital image signal in accordance with the eleventh aspect of the present invention, the reference image data for coding the images for the bidirectional prediction, is blocked in a form similar to that of the DCT block by the blocking means, the coding is carried out highly efficiently in respect of the data of the block, the reference of the data is carried out by decoding the data in writing and reading the data to and from the memory after minimizing the information to be stored in the memory and further the decoding is carried out such that the time axis of the image data is brought into alignment with the time axis of the audio signal.

According to the decoding device of a digital image signal in accordance with the twelfth aspect of the present invention, the reference image data is transformed in a form similar to that of a screen input by the raster-transforming means, the coding is carried out highly efficiently in respect of the raster-transformed data and the reference of the data is carried out by decoding the data in writing and reading the data to and from the memory after minimizing the information to be stored in the memory.

According to the decoding device of a digital image signal in accordance with the thirteenth aspect of the present invention, the prediction value from the contiguous pixel is calculated and the difference from the prediction value is calculated whereby the calculation result concentrates in the proximity of 0. Therefore, even if a coarse quantization is carried out at portions other than the concentrated portion, the information to be stored in the memory is reduced with almost no deterioration of image quality and further, the scale is significantly reduced.

According to the decoding device of a digital image signal in accordance with the fourteenth aspect of the present invention, the contiguous pixel the location of which is the most proximate to the data in respect of the space and time of the screen, is selected whereby the degree of concentration of the value of the data is enhanced. Accordingly, the degree of deterioration of the image quality is further lowered and yet the scale remains almost unincreased.

According to the decoding device of a digital image signal in accordance with the fifteenth aspect of the present invention, the data is blocked, the dynamic range is calculated and the quantization is allocated within the range. Therefore, it is possible to set quantization levels dispensing with wasteful quantization out of the dynamic range whereby even if a further coarse quantization is carried out, almost no deterioration of the image quality is resulted and therefore, the information to be stored in the memory is further reduced and yet the scale remains almost unincreased.

According to the decoding device of a digital image signal in accordance with the sixteenth aspect of the present invention, the data is blocked, the quantization is allocated according to the distribution of the data and therefore, it is possible to set quantization levels which are not affected by noise and resulting in no deterioration of image quality in respect of noise. Furthermore, it is possible to set the quantization levels dispensing with wasteful quantization out of the distribution whereby even if a further coarse quantization is carried out, almost no deterioration of image quality is resulted.

According to the decoding device of a digital image signal in accordance with the seventeenth aspect of the present invention, the blocks are selected such that the block are the most proximate to each other in respect of the space within the same time period of the screen whereby the degree of concentration of the value of the data is enhanced and therefore, the degree of deterioration of the image quality is further reduced and yet the scale remains almost unincreased.

According to the decoding device of a digital image signal in accordance with the eighteenth aspect of the present invention, the quantization levels enlarging the error are calculated and the representative values are coded whereby the error of quantization is made extremely small even if the data is decoded.

According to the coding and decoding device of a digital image signal in accordance with the nineteenth aspect of the present invention, the way of using the prediction memories for coding information source by utilizing the bidirectional prediction of the image signal and the DCT transformation, is transmitted as the information and is utilized on the side of decoding whereby the same operation is carried out in respect of the information on the side of coding and on the side of decoding. As a result, the amount of memory can be saved in a state where the deterioration of the image quality is made extremely small.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 illustrates a block diagram of a coding device of a digital image signal according to Embodiment 1 of the present invention and a coding unit of a coding and decoding device of a digital image signal according to Embodiment 3 thereof;

FIGS. 2(A) and 2(B) are diagrams explaining a coding control of a digital image signal according to Embodiment 1 and a decoding control of a digital image signal according to Embodiment 2;

FIG. 3 is a diagram explaining the operation of a blocking circuit in the coding device of a digital image signal according to Embodiment 1 and the operation of a blocking circuit in a decoding device of a digital image signal according to Embodiment 2;

FIG. 4 is a diagram explaining the operation of a coder in respect of a difference from a prediction in the coding device of a digital image signal according to Embodiment 1 and the operation of a coder in respect of a difference from a prediction in the decoding device of a digital image signal according to Embodiment 2;

DETAILED DESCRIPTION OF THE PREFERRED EMBODIMENTS

EMBODIMENT 1

An explanation will be given of an embodiment of the present invention in reference to the drawings as follows.

Figure 12:
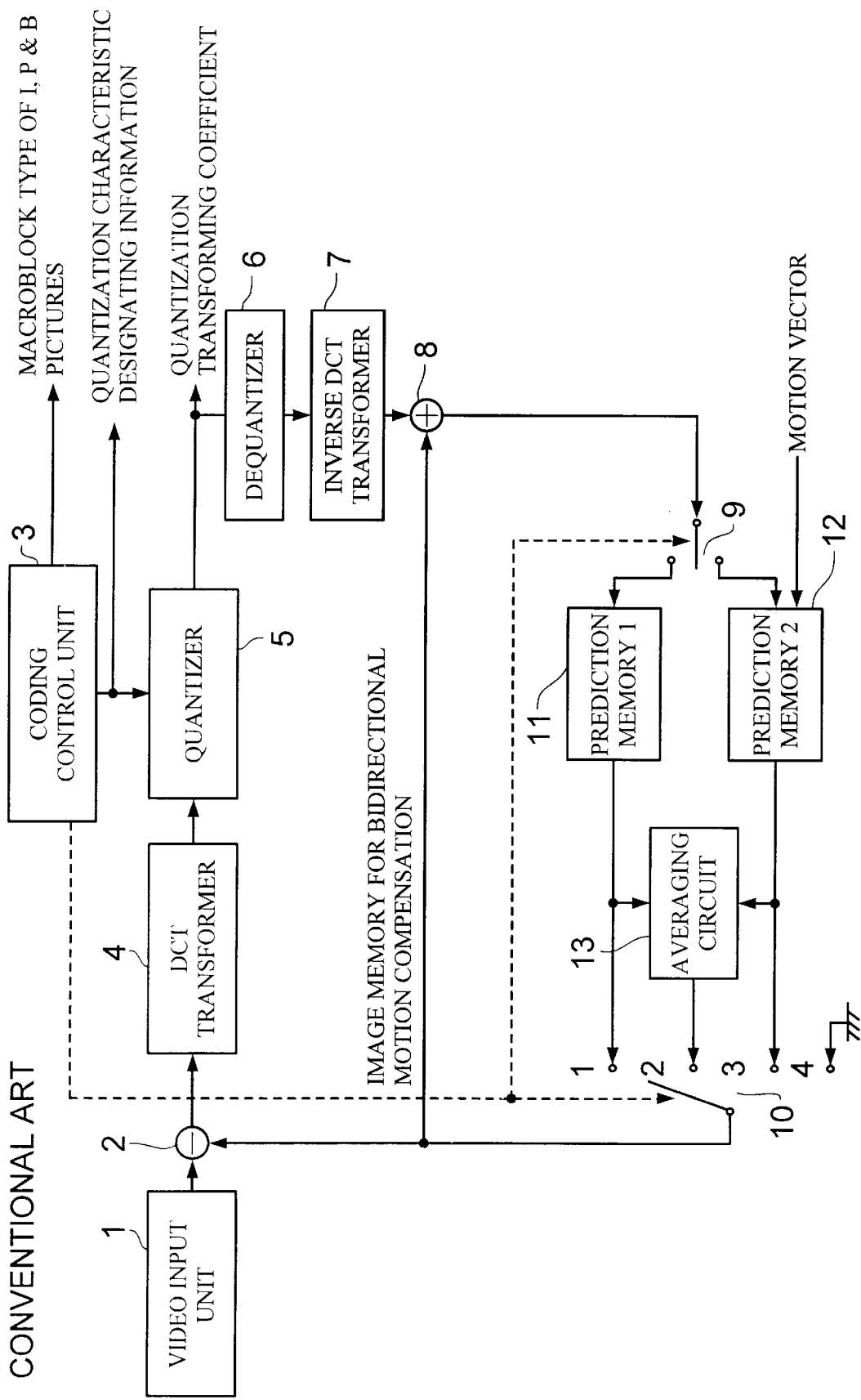
FIG. 12 is a block diagram of a conventional coding device of a digital image signal.
Figure 13:
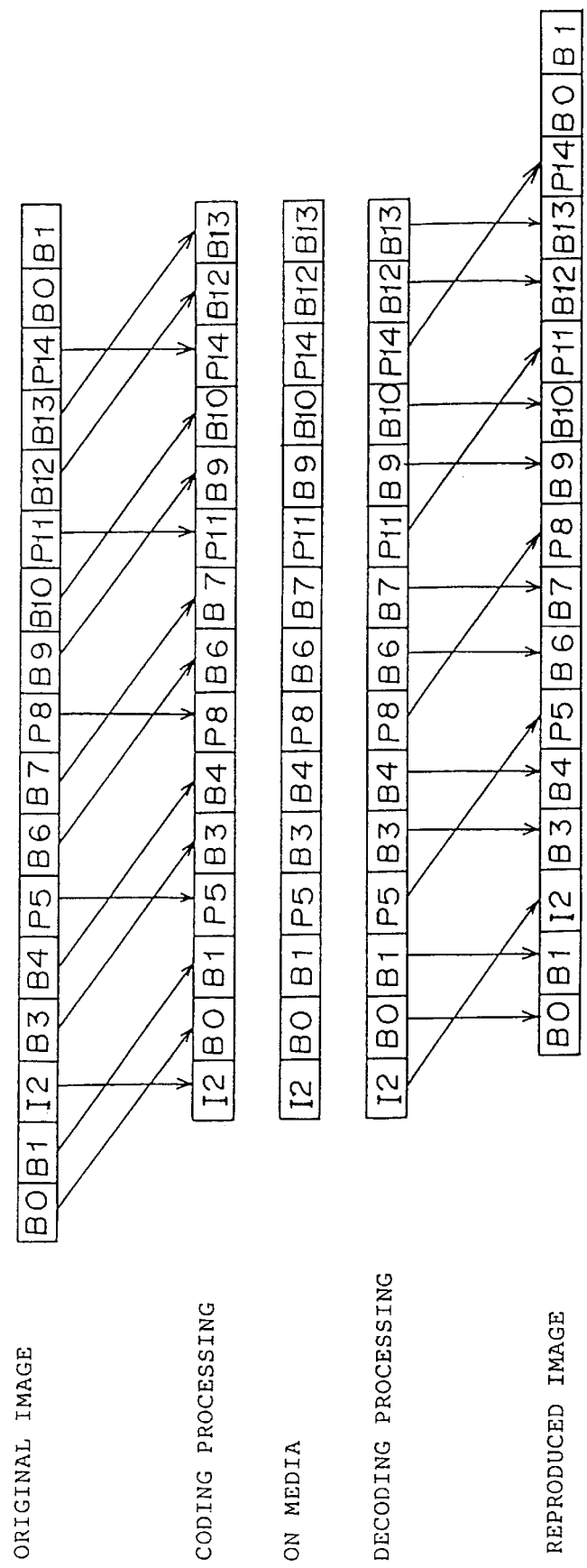
FIG. 13 is a diagram explaining the operation of the conventional coding device of a digital image signal.
Figure 14:
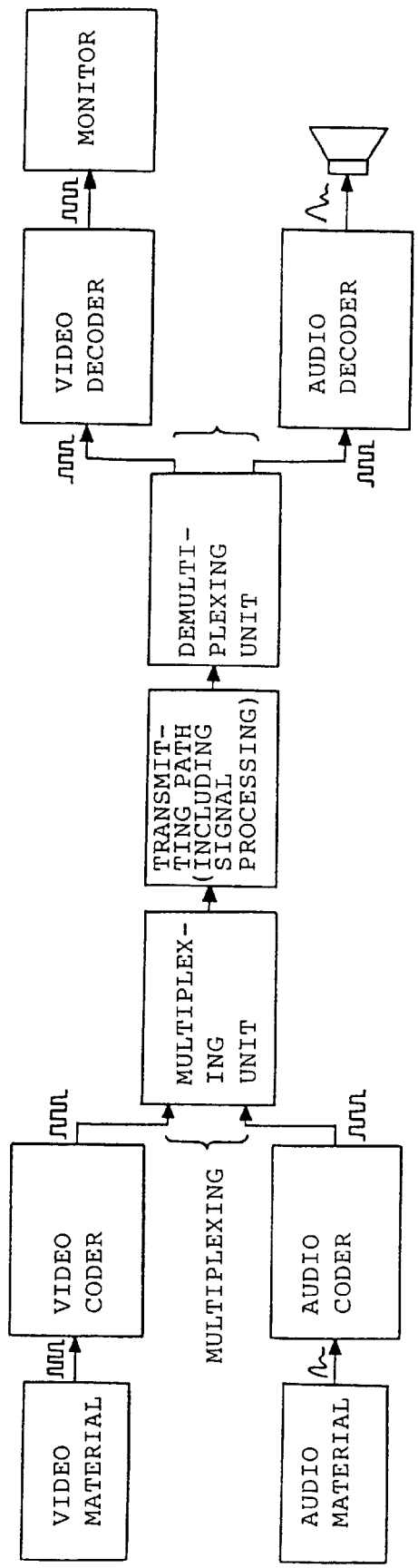
FIG. 14 is a block diagram explaining a total of a conventional coding and decoding system of a digital image signal.
Figure 15:
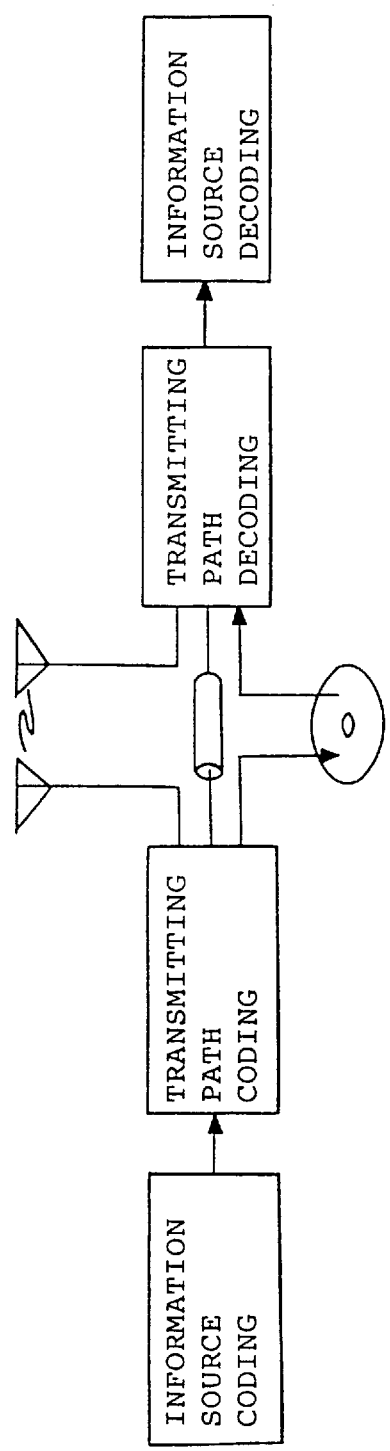
FIG. 15 is a block diagram showing the outline of signal processing for conventional coding and decoding operation of a digital image signal.

FIG. 1 is a block diagram showing a digital image signal processing unit in a coding device of a digital image signal, constituting a stage prior to a step of forming a variable length code. In FIG. 1 notations the same as those in FIG. 12 designate respectively the same or the corresponding portions, numeral 24 designates a blocking circuit or a scan-transforming circuit, numeral 25 designates a coder, numerals 26 and 27 designate decoding circuits, and numerals 28 and 29 designate deblocking circuits or scan-inverse-transforming circuits.

Next, an explanation will be given of the operation. In FIG. 1 portions having notations the same as those in FIG. 12 perform substantially the same operation and accordingly, the explanation will be omitted. However, the following explanation is based on MPEG 2. That is, the explanation deals with an interlace scanning image. Therefore, there also is a mode conducting field DCT transformation. Data once quantized in the frequency region of DCT, is outputted to form a variable length code with no deterioration of information. In the mean time, the data is dequantized, subjected to the inverse DCT transformation, processed into data in the original space region, decoded in respect of the motion compensating prediction at the adder 8 and is stored to the prediction memories 11 and 12 via the blocking circuit or scan-transforming circuit 24 and the coder 25.

Data substantially equal to the original image data is outputted from the adder 8 at every DCT block. The data is further blocked, or scan-transformed, or blocked and scan-transformed by the blocking circuit or scan-transforming circuit 24. The data is compressed in a fixed code length by the coder 25 to thereby compress bits. For example, when a difference thereof in respect of a contiguous pixel in a block is calculated, since normally the contiguous pixel has almost the same value, the difference value approaches to 0. Therefore, the effective dynamic range of the difference value is deviated. Although the data before calculating the difference value necessitates all of 8 bits, if the data is replaced by the difference value, the difference value data is not so much influenced if it is quantized with the value of 5 bits or 6 bits.

Although in this embodiment the pixel for calculating the difference is expressed as the contiguous pixel, this is because the value of the contiguous pixel is determined as the prediction value of the pixel and therefore, an average thereof in respect of other contiguous pixel may be the prediction value of the pixel. When only one pixel is provided as a pixel having a value for not calculating the difference value in a block, the pixel can be restored as an independent data in each block in the process of decoding. Therefore, this procedure is normally performed.

In other words, even if quantization levels are distributed such that the nearer the levels to 0 the more densely they are distributed and the more remote the levels from 0 the more coarse they are distributed, no significant adverse influence is resulted. Furthermore, when the sign of the difference is determined and the negative difference value is calculated to subtract from the maximum value of the range, one bit of the dynamic range can further be saved. In this case it is necessary to devise such that the side of decoding reassigns the quantization level in the case where the range which becomes negative is subtracted from the maximum value in order to avoid the erroneous determination of the positiveness and negativeness of the range. When such a sign determining type difference quantization is conducted, it goes without saying that the nearer the quantization levels to 0 and the nearer the levels to the maximum value, the more densely the above-mentioned quantization levels are distributed and the nearer the levels to an intermediate range, the more coarsely the quantization levels are distributed.

When such an operation is performed, the amount of data written to the prediction memories 11 and 12 is approximately halved whereby the memory can be saved. According to a simulation result by the inventors, it was found that even if the amount of information is halved by using such a method, the image quality is not so much influenced thereby.

The quantized data having a fixed length is stored in the prediction memory 11 or the prediction memory 12 and is rendered a memory element of a reference image for calculating a motion vector or calculating motion compensating prediction. If the memory is normally in a one-to-one relationship with regard to the position of image, a circuit controlling the memory can be downsized.

To restore the quantized value of the difference value to a value approximately equal to the original value by extracting the motion vector or by taking out data with regard to the position of the calculated motion vector from the memories 11 and 12, the data is processed by the decoding circuits 26 and 27 and the deblocking circuits or scan-inverse transforming circuits 28 and 29. In the decoding circuits 26 and 27 the decoding is started with the pixel in respect of which no difference calculation is performed in a block as a starting point. Firstly, the quantized data is replaced by a representative value corresponding to quantization levels and the difference value is restored to a value approximately equal to the original value by adding it to the value of the pixel of which difference value is not calculated. Next, the replacement and addition is repeated in the order of scanning. When the sign determining type reference quantization is conducted at this occasion, the value is replaced by a remainder calculation of the dynamic range if it exceeds the dynamic range as a result of the addition.

The deblocking circuits or scan-inverse-transforming circuits 28 and 29 perform the operation inverse to the blocking circuit or scan-transforming circuit 27 and controls to transform the data such that the difference is formed at the difference former 2 where the timing is brought into alignment with that of the video input unit side. In the mean time, the nearest portions of the image data are searched to calculate the motion vector whereby the motion vector is calculated. The deblocking and the scan-inverse-transformation are carried out in compliance with the request of the search.

In this way the coding device of a digital image signal capable of conducting equivalent compression while reducing the region of the memory, can be constituted.

However, actually, image signal is normally transmitted along with audio signal and therefore, it is necessary to bring these two data into alignment with each other with considerable temporal accuracy. According to MPEG a time axis information as a timer counted at 90 kHz is multiplexed for this purse. Therefore, the processing must be performed previously by that amount of time. FIGS. 2(A) and 2(B) indicate such a state. If the signal processing time centering on the coding and decoding operation in Embodiment 1 is designated by Δt sec. and the conventional processing timing is as illustrated in FIG. 2(A), the memory control is carried out with regard to the processing timing in Embodiment 1 such that the reading from the memories is started earlier by Δt sec. as illustrated in FIG. 2(B). Thereby, the coding device of a digital image signal can be constituted with no shift caused by the processing.

The processing time can strictly be calculated in the case of forming a code having a fixed length. Therefore, it is advantageous as a coding system for the control of processing and time control to form a code having a fixed length. The processing time is allowable if it is smaller than a period of time during which the data of the motion vector in the search range has been written. Therefore, with regard to a large screen having about 720 pixels as in the NTSC level, the processing time is very much smaller than the time of one frame and therefore, there causes no contradiction in the processing.

Next, with regard to the blocking operation, the reference of processing is constituted by a small block normally comprising 8 pixels×8 pixels that is referred to as DCT, even if a macroblock is adopted, four DCT blocks are allocated to the luminance signal and two DCT blocks are allocated to the chrominance signal, the data disposed at the same position in a screen is rendered the unit of processing, four motion vectors are provided to a macroblock and accordingly, it is convenient to deal with the data in a blocked state although it is not indispensable. It is naturally allowable to deal with data in a single horizontal row as an aggregation as in the scanning line in NTSC.

In order to deal with the data of DCT blocks by the unit of a scanning line, in the case of NTSC, the operation of the blocking circuit and scan-transforming circuit 24 may be constituted to conduct the raster-transforming operation as in vertical 1 pixel×horizontal 720 pixels. In this way the data can be stored in the prediction memory with data arrangement the same as those in the input screen.

The raster-transformation may naturally be performed in respect of small divisions as in vertical 1 pixel×horizontal 16 pixels and similar operation may be performed by regarding the transformation result as a block.

That is, it is not necessary to change the processing of calculating the difference in accordance with whether the block for calculating the difference is in a square form or in a horizontal linear form. When the prediction value is calculated from the above-mentioned contiguous pixel (the contiguous pixel may constitute the prediction value as it is), the difference value thereof in respect of the prediction value is calculated and the value is coded and stored in the prediction memories 11 and 12 whereby the region of the memory can be saved invariably to about a half thereof.

Next, an explanation will be given of scanning operation. For example, consider a case where the DCT block is coded as it is as a block. When the scanning is performed in a block of 8 pixels×8 pixels and coding is conducted, the scanning may be performed in zigzag with a left uppermost pixel as the pixel for not calculating the difference value as illustrated in FIG. 3. The positional relationship among pixels arranged in the arrow mark direction constitute contiguous pixels. That is, when a contiguous pixel is rendered a pixel of the prediction value as it is, the difference value of a pixel A in FIG. 3 is provided as a result of subtraction in respect of a pixel B.

Furthermore, the prediction value may be calculated not only by adopting a pixel disposed in the direction inverse to the progressing direction of the arrow mark, but by including, for example, also a pixel having a positional relationship orthogonally intersecting with the progressing direction, or by setting a pixel in consideration of a two-dimensional arrangement as illustrated in FIG. 4 and by performing an averaging calculation etc. In this case in scanning the data as illustrated in FIG. 3, at an end point where such a pixel does not exist in the block, the value of a pixel orthogonally intersecting with the progressing direction may be rendered the same as the value of the pixel in the direction inverse to the progressing direction. Further, although the initial point in the block is rendered the point for not calculating the difference, it goes without saying that a difference in respect of 0 may be prepared whereby the quantization is performed.

Figure 5:
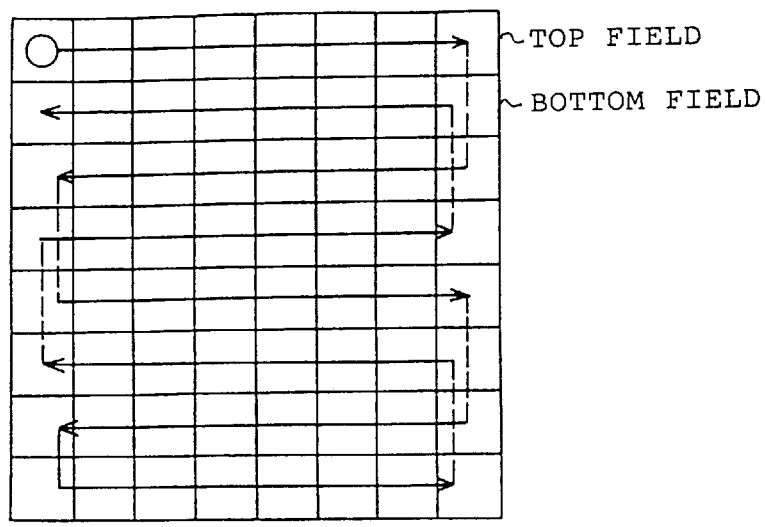
FIG. 5 is a diagram explaining the operation of a blocking circuit blocking with insignificant deterioration of image quality in the coding device of a digital image signal according to Embodiment 1 and the operation of a blocking circuit blocking with insignificant deterioration of image quality in the decoding device of a digital image signal according to Embodiment 2.

Next, an explanation will be given of the optimization of the scanning operation. The explanation deals with images centering on an interface scanning image as in MPEG 2. That is, dynamic images are represented by constituting fields alternately by temporally different images and also by spatially different images. When the alternately emerging fields are classified into top fields and bottom fields, respectively, if the data is subjected to the inverse DCT transformation and the motion compensating prediction is decoded, the screen is constituted such that the scanning lines of bottom field are inserted among the scanning lines of the top field as illustrated in FIG. 5. Therefore, if the scan-transformation is carried out fixedly in respect of the top field and the bottom field, when, for example, a motion is caused and the top field and the bottom field constitute images which are different by the amount of the motion, the difference values of the contiguous pixels are difficult to concentrate on 0. Therefore, the dynamic range of difference values is widened and portions magnifying the deterioration of the image quality emerge by the quantization.

To prevent this phenomenon, the control of the blocking circuit or scan-transforming circuit 24 is changed and the contiguous pixels are seeked by performing the blocking operation as illustrated by the arrow marks of FIG. 5. That is, the scanning is controlled with priority in respect of the same field. By this control the differences in respect of the prediction values concentrate in the proximity of 0 even if a motion is caused.

Figure 9:
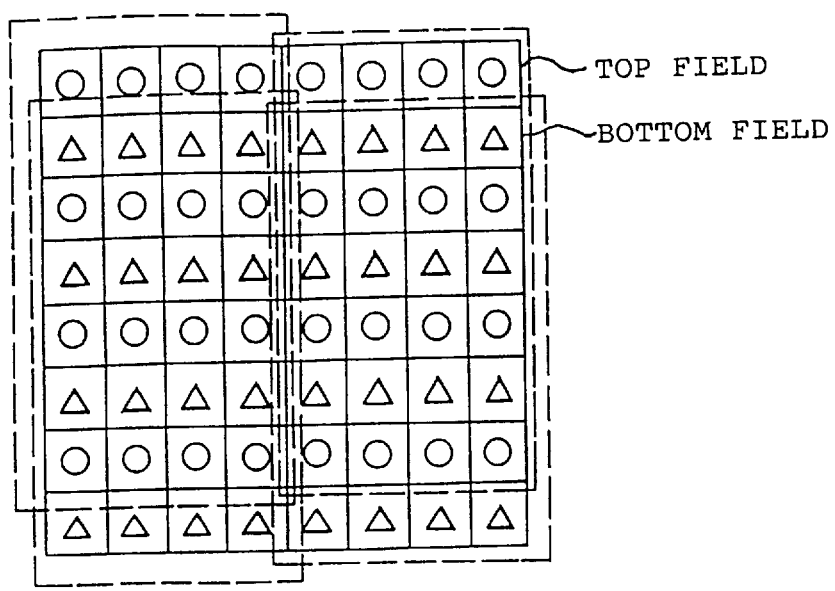
FIG. 9 is a diagram explaining an example of the operation of the blocking circuit in coding data from the dynamic range or the distribution of image data in the coding device of a digital image signal according to Embodiment 1 and an example of the operation of the blocking circuit in coding data from the dynamic range or the distribution of image data in the decoding device of a digital image signal according to Embodiment 2.

Although the top field and the bottom field are mixed in one block in FIG. 5, they may be separated into totally different blocks as illustrated in FIG. 9.

There is one location in FIG. 5 where the top field and the bottom field constitute the positional relationship of contiguous pixels and if a motion is caused at this portion the problem the same as the abovementioned problem remains. However, such a portion is extremely small in respect of area and the problem may be disregarded. Further, although the DCT block constitutes one block in FIG. 3, the DCT block is scanned by frame as well as by field and the reading calculation from the memory is complicated. Meanwhile, the scanning operation illustrated in FIG. 5 is very convenient since the operation is not influenced by the DCT block.

Although the explanation has been given of the coding device of a digital image signal which compresses information by quantizing the differences in respect of the prediction values derived from the contiguous pixels and writing it to memories, an explanation will be given hereinafter of a coding device of a digital image signal compressing information with blocks as aggregations and writing it to memories.

Figure 6:
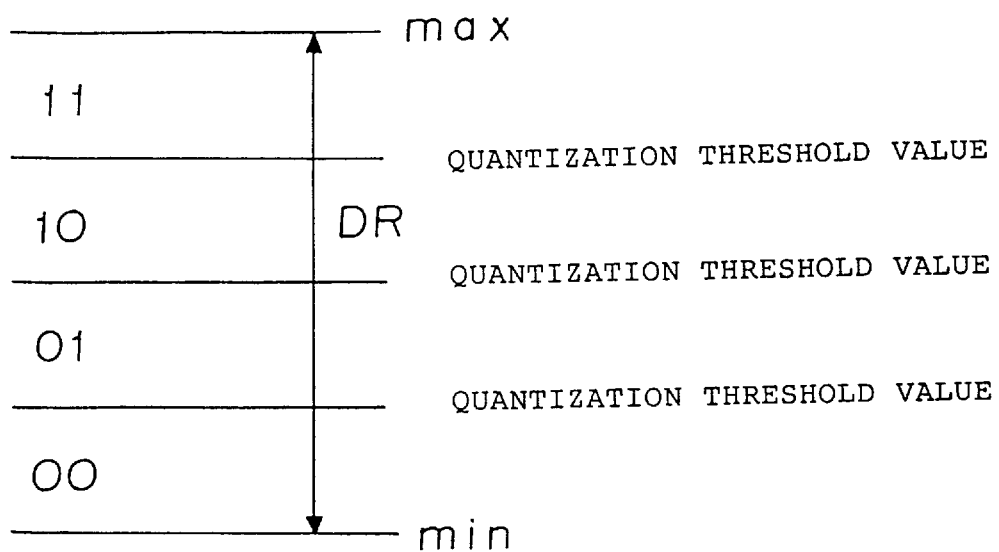
FIG. 6 is a diagram explaining the operation of the coder in respect of a dynamic range in the coding device of a digital image signal according to Embodiment 1 and the operation of the coder in respect of a dynamic range in the decoding device of a digital image signal according to Embodiment 2.

FIG. 6 is a diagram for explaining the concept of a coding device of a digital image signal which compresses information with blocks as aggregations and writing it to prediction memories. A maximum value and a minimum value of all the pixels in each block are respectively calculated. The values of pixels in each block fall in a range specified by the respective maximum value and minimum value. The interval between the maximum value and the minimum value is rendered the dynamic range DR and quantization threshold values uniformly dividing DR are set. These are referred to as quantization reference values.

FIG. 6 illustrates the quantization procedure in which the interval from the maximum value to the minimum value is divided in four and representative values are normally calculated as averages of the quantization threshold values.

The decoding is performed with respect to the maximum value, the minimum value and the quantization results of the respective pixels. An expression by 2 bits is given to the quantization results of the respective pixels each according to FIG. 6. Also, instead of the maximum value and the minimum value, either one of the maximum value and the minimum value and the dynamic range DR may be coded.

When 8 bits data of 8 pixels×8 pixels is expressed by 8 bits of the maximum value and the minimum value and 2 bits of the quantization results, the compression rate is 9/32. Incidentally, according to this coding the scanning is necessary only for calculating the maximum value and the minimum value and accordingly, there is no problem of scan-transformation although the problem of optimizing the blocking remains.

The data can be decoded by the maximum value and the minimum value (or data corresponding thereto) and the quantization results of necessary pixels. In the mean time, according to the way of calculation whereby the difference in respect of the prediction value derived from the contiguous pixel is calculated, it is necessary for decoding one pixel to decode all of the data which have been scanned prior to the one pixel and when the operation is used in the motion compensating prediction necessitating the reading of an arbitrary position, the control of the memory is complicated. However, in such a case, the quantization results for the respective pixels depend only on the maximum value and the minimum value (or data corresponding thereto) and accordingly, the reading control of the memory is simplified and the access frequency is reduced.

Next, an explanation will be given of a case where the quantization reference values are determined not by determining the quantization reference values directly from the maximum value and the minimum value but through a further processing procedure.

Normally, noises in some forms are often superposed on images. For example, there are noise at CCDs of a video camera and noise that is generated in converting an analog signal into a digital signal. These are random noises and a coding device of a digital image signal honestly codes also these noise components. However, the maximum value and the minimum value in the block are influenced thereby, which adversely influences on the quantization reference values. Therefore, in order to avoid the influence of noise an averaging operation is introduced in calculating the quantization reference values.

Figure 7:
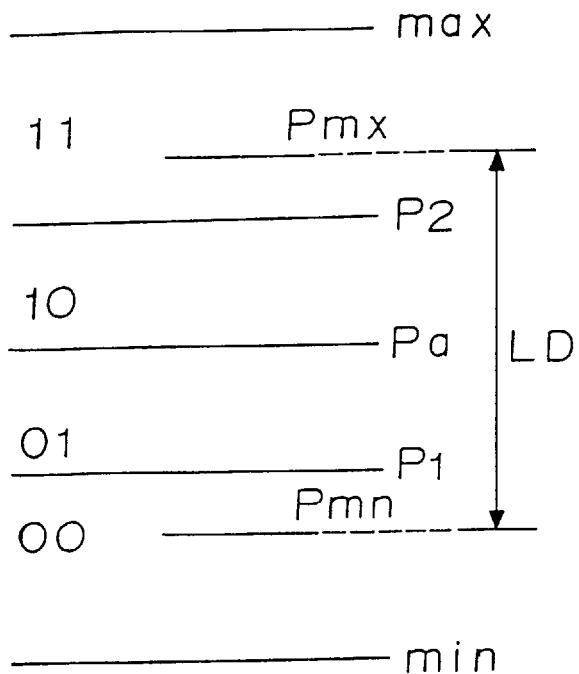
FIG. 7 is a diagram explaining the operation of the coder in respect of a distribution of image data in the coding device of a digital image signal according to Embodiment 1 and the operation of the coder in respect of a distribution of image data in the decoding device of a digital image signal according to Embodiment 2.

For example, in the case of performing a quantization operation having four representative values, the maximum value in the block is designated by Lmx, the minimum value is designated by Lmn, a maximum representative value is designated by Pmx, a minimum representative value is designated by Pmn, a central quantization reference value is designated by Pa and other reference values are designated by P1 and P2 in a block shown by FIG. 7. In this case Pmx, Pmn, Pa, P1 and P2 are calculated to establish the following relationships. Incidentally, a value of a pixel disposed at a location (i,j) is designated by Xij and a quantization result thereof is designated by Φi.

$$Pmx=(\Sigma Xij)/Nmx;$$

where Xij designates a value of a pixel having the value of (3Lmx+Lmn)/4 or more and Nmx is a number of pixels in a block each having a value of (3Lmx+Lmn)/4 or more.

$$Pmn=(\Sigma Xij)/Nmn;$$

where Xij designates a value of a pixel having the value of (Lmx+3Lmn)/4 or more and Nmn designates a number of pixels in a block each having a value of (Lmx+3Lmn)/4 or more.

$$LD=Pmx-Pmn$$

$$Pa=(Pmx+Pmn)/2$$

where i, j designate a sort in a block.

$$\{if(Xij \leq P1) \; \Phi ij=00$$

$$elseif(Xij \leq Pa) \; \Phi ij=01$$

$$elseif(Xij \leq P2) \; \Phi ij=10$$

$$else \; \Phi ij=11\}$$

The coding operation in this case is with regard to Φij, Pa and LD.

When certain threshold values are calculated from the maximum value and the minimum value and averages of values of pixels exceeding these threshold values are calculated in this way, variations of the quantization reference values due to noise are avoided and therefore, the image quality is not adversely influenced thereby. Also, these calculating operations are constituted by simple calculations based on the calculations of average values and therefore, the operations can be realized by a facilitated circuit structure.

Additionally, a width between the quantization reference values of P2−Pa may be coded instead of Ld. P2−Pa is a value that is equal to or smaller than a half or less of LD and therefore the number of bits for coding can be reduced.

The coding is conducted in this way and the coded data is written to the prediction memory 11 and the prediction memory 12 by which the motion vector is calculated or the reading of portions necessary for the motion compensating prediction is carried out. In this case, the read data comprises only Pa and LD (or data corresponding thereto) and the quantization results Φij of necessary pixels.

When the data is read and decoded, the decoding is performed in accordance with the following equations. The decoded result of Φij is designated by Yij.

if(Φ$ij$=00) Yij=Pa−LD/2 if(Φ$ij$=01) Yij=Pa−LD/6 if(Φ$ij$=01) Yij=Pa+LD/6 if(Φ$ij$=11) Yij=Pa+LD/2

The decoding is carried out in this way and therefore, the calculation thereof is significantly simplified in comparison with the calculation in coding and accordingly, which is very convenient in the case where two blocks of the decoding step are necessary as in the device shown in FIG. 1. According to the way of calculating the difference in respect of the prediction value derived from the contiguous pixel, it is necessary for decoding one pixel to decode all of the data which has been scanned prior to decoding the one pixel and the control of the memory is complicated if it is used in the motion compensating prediction necessitating the reading of an arbitrary position. However, in such a case, the quantization results of the respective pixels are dependent on only the maximum value and the minimum (or data corresponding thereto) and accordingly, the reading control of the memory is simplified and the access frequency is reduced.

Although the above explanation has been given with respect to 8 pixels×8 pixels, when the operation is carried out in a smaller range such as 4 pixels×4 pixels the dynamic range or LD is decreased and therefore, the deterioration of image quality is diminished which is preferable. That is, it goes without saying that it is not necessary to be particular about the size or the shape of the block and the block may be set freely, for example, the block may be constituted by 8 pixels×2 pixels. Although the area of the block of 8 pixels×2 pixels is the same as that of 4 pixels×4 pixels, the size of the resistor (or memory) in the blocking operation may be reduced.

Figure 8:
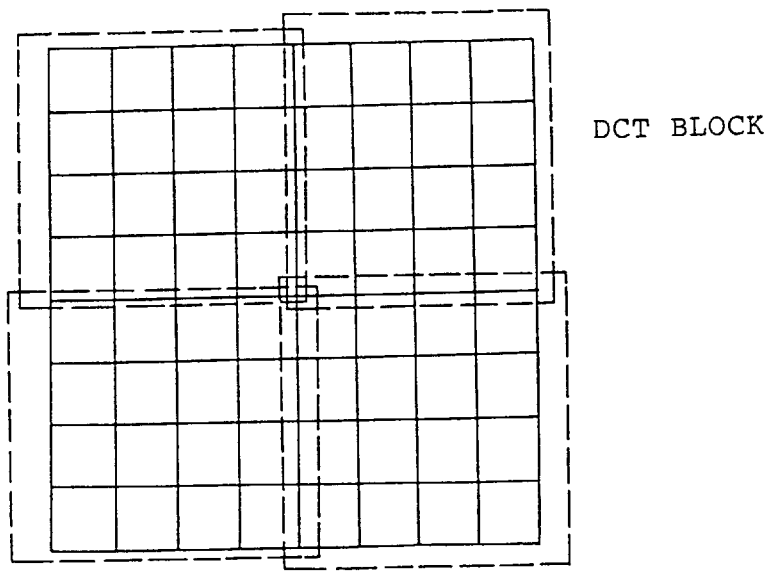
FIG. 8 is a diagram explaining an example of the operation of the blocking circuit in the coding device of a digital image signal according to Embodiment 1 and an example of the operation of the blocking circuit in the decoding device of a digital image signal according to Embodiment 2.

Next, an explanation will be given of the optimization of the blocking in this case. For example, when one block is constituted by 4 pixels×4 pixels, it is possible to divide the DCT block in four in a shape of aggregated squares as illustrated in FIG. 8. However, if there causes a motion in the interface scanning image, the correlation of data is lost among the fields and accordingly, it is preferable to block the data in the same field. That is, as illustrated in FIG. 9 the blocking is conducted to constitute 4 pixels×4 pixels in the top field and 4 pixels×4 pixels in the bottom field. In this way it is possible to provide a coding whereby the dynamic range or LD is reduced and the deterioration of the image quality is minimized even if the image has a motion.

The blocking may naturally be switched in accordance with the motion. In that case it is preferable not only to change the way of blocking in accordance with the motion but to code the information of the way of blocking. That is, the field blocking and the frame blocking are constituted to switch by the motion vector and the mode of the DCT blocking and the switching of the blocking means is coded. It goes without saying that the operation is not limited to the blocking of 4 pixels×4 pixels but the blocking of 4 pixels×4 pixels may be switched to that of 8 pixels×2 pixels or vice versa to minimize the value of the dynamic range or LD.

Figure 10:
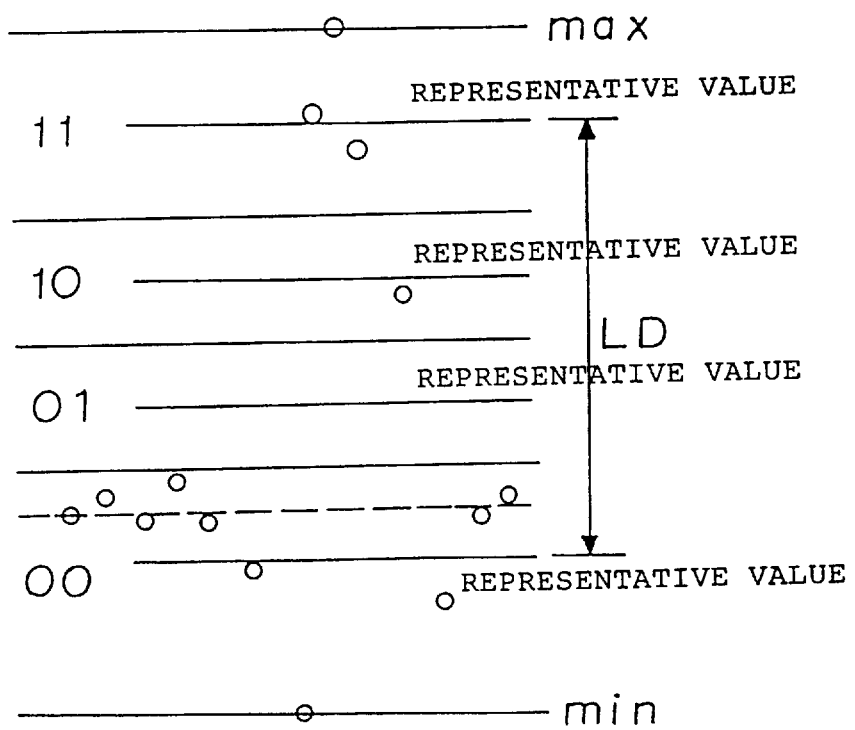
FIG. 10 is a diagram explaining an example of the operation in the case where a coder operating to replace representative values by a coding circuit in coding data from the dynamic range or the distribution of image data, is constituted in the coding device of a digital image signal according to Embodiment 1 and an example of the operation of the blocking circuit in the case where representative values are replaced by a coding circuit in coding data from the dynamic range or the distribution of image data in the decoding device of a digital image signal according to Embodiment 2.

Next, a further countermeasure against image deterioration will be described. The above-mentioned quantization reference values or representative values are univalently determined from the maximum value, the minimum value, or Pa, LD or values corresponding thereto. If the respective pixels are pertinently distributed, such a quantization or calculation of representative values is appropriate. However, there actually is a deviation in the distribution. For example, when a white line is disposed in a darkish background, the pixels are distributed as illustrated in FIG. 10. In this case the presentative value of the level 00 is changed by the influence of the surrounding of the line. The largest number of pixels are distributed centering on a level designated by a dotted line in respect of the representative value of the level 00 and the error of the pixels is minimized by selecting the level of the dotted line as a representative value. However, if the quantization reference values or the representative values are univalently determined from the maximum value and the minimum value, or Pa and LD or values corresponding thereto in the distribution, the determination will be performed irrespective of the frequency of the distribution, which may cause a deterioration of image quality such as distortion of block etc.

Accordingly, by studying the difference between the representative value of a once quantized result and the original data, representative values having significant accumulation of error are changed and the number (00 in this example) of the representative value to be changed, the difference from the original representative value and the value of the new representative value as it is are coded and stored in the prediction memories 11 and 12 along with the data.

In this way, when the decoder 26 or 27 decodes the data such that the replacement is performed based on the information of the replacement of the representative value and the original representative value (Pa−LD/2) is replaced by a new value in correspondence with the quantization result corresponding to the number of the representative value (Φ00 in this example), the decoding can be performed to produce an image having small error and the deterioration of image quality can be minimized.

As a criteria for determining the largeness or smallness of error, there are a summation of absolute values of differences from the original data, a summation of squares of the differences and the like either of which may be used. Also, conversely, an integration of the difference values instead of the summation of absolute values or the like may be performed for each level or an integration of the summation of squares of the differences may be performed by attaching thereto the original sign based on the way of thinking that the optimization is achieved when the averaging of errors results in 0.

With respect to the replacement operation of the level of the representative value having large error, a level of the representative value whereby a number of pixels having small error is increased the most or an average value of pixels constituting a quantization result which minimizes the error in view of a total of the quantization levels may be calculated.

According to the above-mentioned explanation, the decoders 26 and 27 and the deblocking circuits or scan-inverse-transforming circuits 28 and 29 are independently provided with processing circuits at the output sides of the prediction memories 11 and 12. However, the processing can naturally be realized by a single circuit when an operation having a speed twice as high as that of the processing circuits is performed and a time shearing processing is conducted.

EMBODIMENT 2

Figure 11:
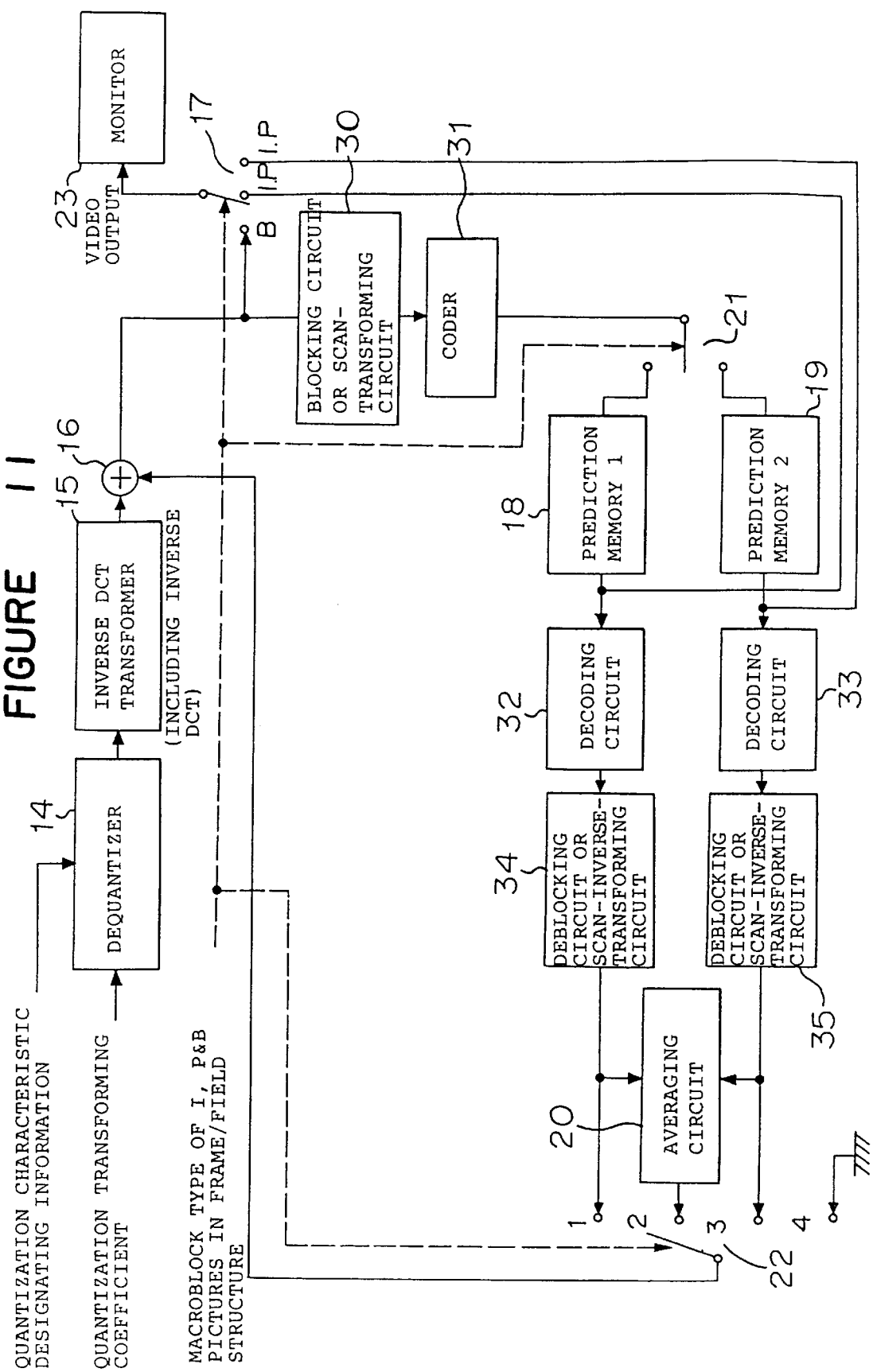
FIG. 11 is a block diagram of a decoding device of a digital image signal according to Embodiment 2 and a block diagram of a decoding unit of the coding and decoding device of a digital image signal according to Embodiment 3.
Figure 16:
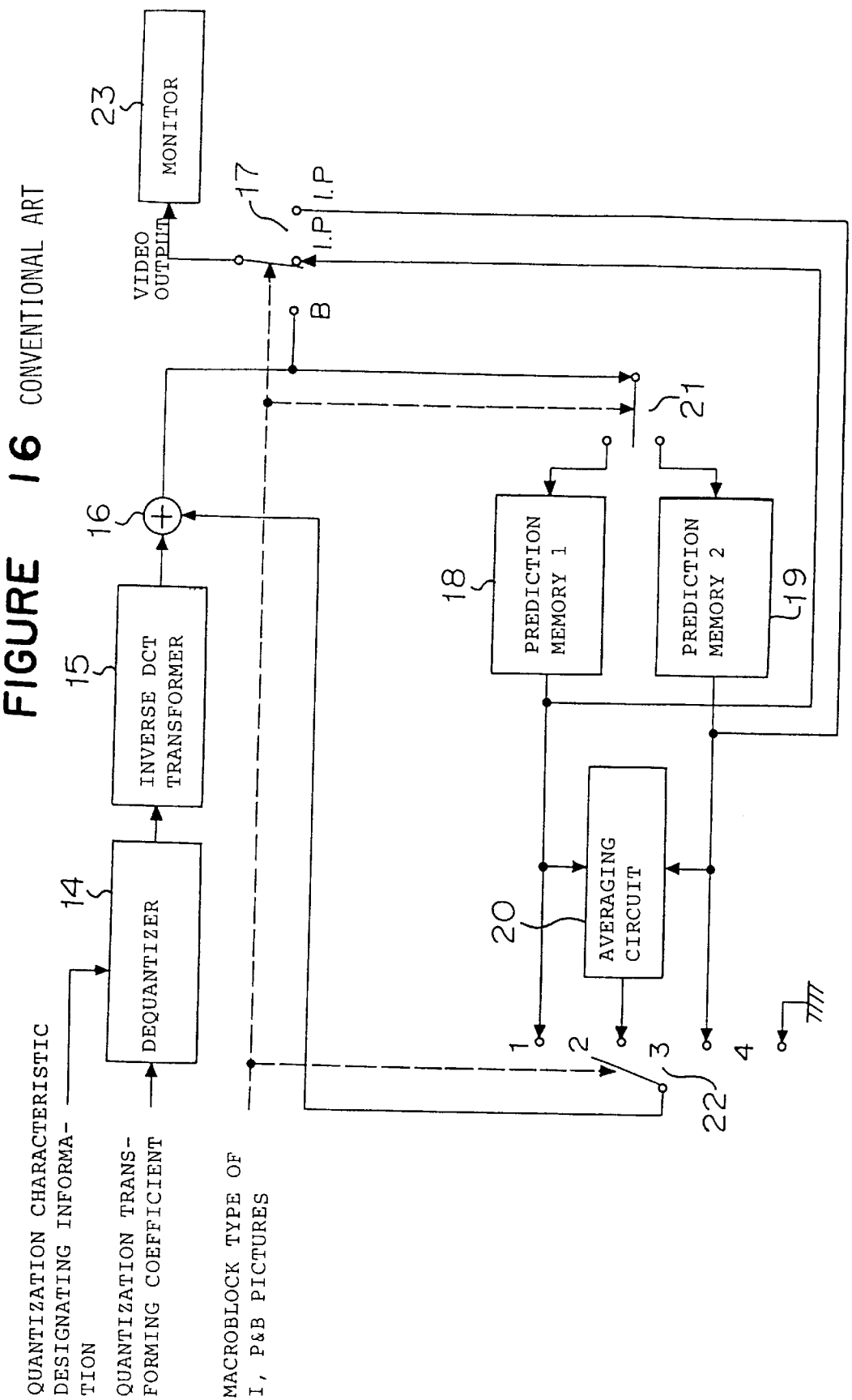
FIG. 16 is a diagram of a conventional decoding device of a digital image signal.
Figure 17:
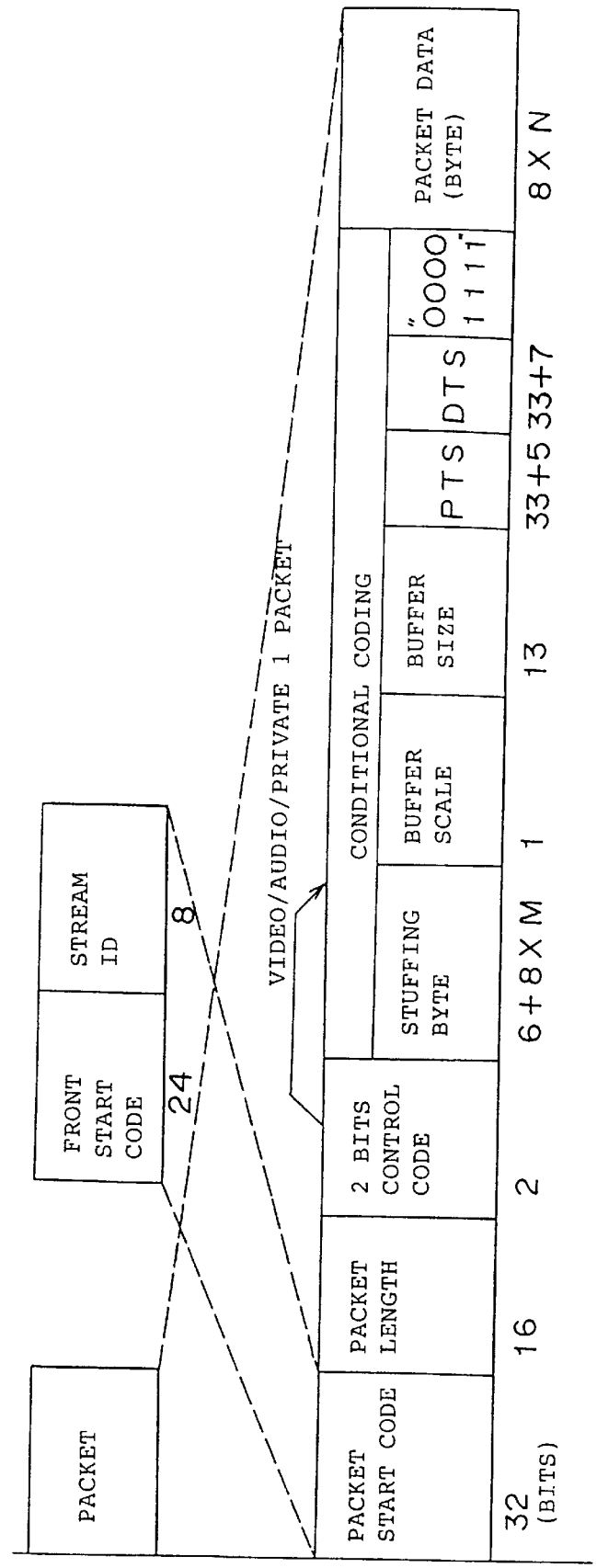
FIG. 17 is a diagram explaining time axis information multiplexing rule in the conventional coding device and the conventional decoding device of a digital image signal.

Next, an explanation will be given of Embodiment 2 of the present invention in reference to the drawings. FIG. 11 is a block diagram showing a digital image signal processing unit in a decoding device of a digital image signal and a step of forming a decoded signal having a variable length and thereafter. In FIG. 11 notations the same as those in FIG. 16 designate respectively the same or the corresponding portions, numeral 30 designates a blocking circuit or scan-transforming circuit, numeral 31 designates a coder, numerals 32 and 33 designate decoding circuits and numerals 34 and 35 designate blocking circuits or scan-inverse-transforming circuits.

Next, an explanation will be given of the operation. Portions in FIG. 11 having notations the same as those in FIG. 16 perform substantially the same operation and the explanation will be omitted. However, the following explanation will be based on MPEG 2. That is, the explanation deals with interlace scanning image. Accordingly, there also is a mode performing field DCT. Data which has been quantized once in the frequency region of DCT, is outputted to subject them to variable length coding with no deterioration of information, in the mean time, it is quantized, subjected to the inverse DCT forming, processed into data in the original space region, decoded in respect of the motion compensating prediction at the adder 16 and the data is stored in the prediction memories 18 and 19 via the blocking circuit or scan-transforming circuit 30 and the coder 31.

Data substantially equal to original image data is outputted from the adder 16 at every DCT block. The data is further blocked, or scan-transformed, or blocked and scan-transformed by the blocking circuit or scan-transforming circuit 30. The data is compressed in a fixed code length by the coder 31 to compress bits. For example, when a difference value in respect of a contiguous pixel in a block is calculated, the difference value approaches 0 since normally the contiguous pixel has substantially the same value. Therefore, the effective dynamic range of the difference values is deviated and although the data necessitates all of 8 bits for the value thereof before calculating the difference, when it is replaced by the difference value, the difference value data is not so much influenced even if the difference value is quantized with the value of 5 bits or 6 bits. Although the pixel for calculating the difference value is expressed as the contiguous pixel, this is because the value of the contiguous pixel is determined as the prediction value of the pixel and therefore, an average thereof in respect of other contiguous pixel may be the prediction value of the pixel. When only one pixel is provided as a pixel having a value for not calculating the difference value in a block, the value of the pixel can be restored as an independent data for each block in the decoding operation. Therefore, this procedure is normally performed.

That is, no significant adverse influence is resulted even if the nearer quantization levels to 0 the more densely they are distributed and the more remote the quantization levels from 0 the more coarse they are distributed. Furthermore, if the sign of the difference is determined and the calculation is performed such that the negative reference value is subtracted from the maximum value of the range, one bit of the dynamic range can further be saved. In this case, it is necessary to devise such that the decoding side reassigns the quantization levels when the range which becomes negative is subtracted from the maximum value in order to avoid the erroneous determination of the positiveness and negativeness of the range. When such a sign determining type difference quantization is performed, it goes without saying that the nearer the above-mentioned quantization levels to 0, or the nearer they are to the maximum value, the more densely they are distributed and the nearer they are to an intermediate range, the more coarsely they are distributed. In this way, the memory can be saved approximately to a half thereof.

The quantized data having a fixed length is stored in the prediction memory 18 or the prediction memory 19 and is made a memory element of reference images for calculating a motion vector or calculating the motion compensating prediction. If the memories each is normally in a one-two-one relationship in respect of the position of the image, a circuit for controlling the memories can be downsized.

The data is processed through the decoders 32 and 33 and the deblocking circuits or scan-inverse-transforming circuits 34 and 35 to extract the motion vector from the memories 18 and 19 or to restore a quantized value of the difference value to a value substantially equal to the original value by taking out the data of the position of the calculated motion vector therefrom. The decoding is started in the decoders 32 and 33 with a pixel for not calculating the difference in a block as a starting point. First, the quantized data is replaced by a representative value corresponding to the quantization level which is added to the value of a pixel for not calculating the difference whereby the difference value is restored to the value substantially equal to the original value. Next, the replacement and the addition are repeated in the order of scanning. In this case, when the sign determining type difference quantization is conducted, if the data exceeds the dynamic range as a result of addition, the value is replaced by a remainder calculation of the dynamic range.

The operation inverse to that of the blocking circuit or scan-transforming circuit 30 is conducted at the deblocking circuits or scan-inverse-transforming circuits 32 and 33 and the circuits are controlled to transform the data such that a difference is formed in alignment with the timing of outputting the data at the inverse DCT formation at the adder 16.

In this way the decoding device of a digital image signal capable of compressing the data equivalently while reducing the area of the memories, can be constituted.

However, actually image data is transmitted normally along with audio signal and the alignment should be taken between the both data with significant temporal accuracy. For this purpose, according to MPEG, the data is transmitted by being multiplexed with time axis information as a timer counted at 90 kHz. The image and the audio signals must be outputted to monitors or speakers in accordance with the time axis information. Therefore, the processing must be conducted previously by that amount of time. FIGS. 2(A) and 2(B) illustrate this state. If a signal processing time centering on the coding and decoding operation of Embodiment 2 is designated by Δt sec., when the conventional processing time is as illustrated in FIG. 2(A) with respect to the processing timing of Embodiment 2, the memory control is performed such that the reading from the memory is started earlier by Δt sec. as illustrated in Figure (B). In this way a decoding device of a digital image signal with no shift due to the processing can be constituted.

With regard to processing timing, when a code having a fixed length is formed, the timing can be calculated strictly and therefore, the formation of a code having a fixed length as a coding system is advantageous in view of the control of processing and time control.

Further, the processing time is allowable if it is smaller than a period of time within which data in the range of the motion vector has been written. Therefore, in the case of a large screen having approximately 720 pixels as in the NTSC level, the processing time is very small in comparison with a time period of one frame whereby the contradiction of processing is not caused.

Next, an explanation will be given of the blocking operation. The reference of processing is constituted by a small block comprising normally 8 pixels×8 pixels that is referred to as DCT, even if a macroblock is adopted, four DCT blocks are allocated to the luminance signal and two DCT blocks are allocated to the chrominance signal, the data disposed at same position in a screen is rendered the unit of processing, four motion vectors are allocated to one macroblock and accordingly, it is convenient to deal with the data in a blocked state although it is not indispensable. It is naturally allowable to deal with data in one horizontal row as an aggregation as in the scanning line in NTSC.

In order to deal with the data of DCT blocks by the unit of a scanning line, in the case of NTSC, the operation of the blocking circuit or scan-transforming circuit 30 may be constituted to perform the raster-transforming operation as in vertical 1 pixel×horizontal 720 pixels etc. The raster-transformation may naturally be performed in small divisions as in vertical 1 pixel×horizontal 16 pixels and a similar operation may be conducted by regarding the transformation result as a block.

That is, it is not necessary to change the processing of calculating the difference in accordance with whether the block for calculating the difference is in a square form or in a horizontal linear form. The prediction value is calculated from the above-mentioned contiguous pixel (the contiguous pixel may be the prediction value as it is), the difference value thereof in respect of the prediction value is calculated and the data is coded and stored in the prediction memories 18 and 19 whereby the region of the memory can be saved invariably to about a half thereof invariably.

Next, an explanation will be given of scanning operation. For example, consider a case where the DCT block is coded as it is as a block. That is, when the coding is performed by scanning a block of 8 pixels×8 pixels, the scanning may be performed in zigzag with a left uppermost pixel as the pixel for not calculating the difference value as illustrated in FIG. 3. In this case the positional relationship among pixels arranged in the arrow mark direction constitute contiguous pixels. That is, when the contiguous pixel is rendered the prediction pixel as it is, the difference value of a pixel A in FIG. 3 is provided as a result of subtraction in respect of a pixel B.

Further, the prediction value may be calculated not by adopting a pixel arranged in the direction inverse to the progressing direction of the arrow mark but including, for example, also a pixel having a positional relationship, for example, orthogonally intersecting with the progressing direction, or by setting a pixel in consideration of a two-dimensional arrangement as illustrated in FIG. 4 and by performing an averaging calculation etc. In this case in scanning the data as illustrated in FIG. 3, at an end point where such a pixel does not exist in the block, the value of a pixel orthogonally intersecting with the progressing direction may be rendered the same as the value of the pixel arranged in the direction inverse to the progressing direction. Further, although the initial point in the block is made the point for not calculating the difference, it goes without saying that a difference in respect of 0 is prepared and the quantization is performed.

Next, an explanation will be given of the optimization of the scanning operation. The explanation deals with images centering on an interlace scanning image as in MPEG 2 etc. That is, dynamic images are represented by constituting fields alternately by temporally different images and also by spatially difference images. When the alternately emerging fields are classified respectively into top fields and bottom fields if the data is subjected to the inverse DCT transformation and the motion compensating prediction is decoded, the screen is constituted such that the scanning lines of the bottom field are inserted among the scanning lines of the top field as illustrated in FIG. 5. Therefore, when the scan-transformation is performed fixedly with respect to the top field and the bottom field, if, for example, a motion is caused and the top field and the bottom field constitute images which are different by the amount of the motion, the difference values of the contiguous pixels are difficult to concentrate on 0. Therefore, the dynamic range of difference value is widened and portions magnifying the deterioration of image quality emerge by the quantization operation.

To prevent this phenomenon, the control of the blocking circuit or scan-transforming circuit 30 is changed and contiguous pixels are seeked by performing the blocking operation as designated by the arrow marks in FIG. 5. That is, the scanning is controlled with priority in respect of the same field. In this way, the differences in respect of the prediction value concentrate in the proximity of 0 even if the motion is caused.

Although the top field and the bottom field are mixed in one block in FIG. 5, they may be separated into totally different blocks as illustrated in FIG. 9.

There is one location in FIG. 5 where the top field and the bottom field constitute a positional relationship of contiguous pixels and if a motion is caused at that portion, the same problem as the above-mentioned problem remains. However, such a portion is extremely small in respect of area and accordingly, the problem may be disregarded. Further, although the DCT block constitutes one block in FIG. 3, the DCT block is scanned by frame or by field and therefore, the reading calculation from the memory is complicated. Meanwhile, the scanning operation illustrated in FIG. 5 is very convenient since the operation is not influenced by the DCT block.

Although the explanation has been given of the decoding device of a digital image signal compressing information by quantizing the differences in respect of the prediction values derived from the contiguous pixels and writing it to memories, an explanation will be given hereinafter of a decoding device of a digital image signal compressing information with blocks as aggregations and writing it to memories.

FIG. 6 is a diagram for explaining the concept of a decoding device of a digital image signal compressing information with blocks as aggregations and the writing it to prediction memories. A maximum value and a minimum value of all the pixels in each block are respectively calculated. The values of the pixels in each block fall in a range specified by the respective maximum value and minimum value. The interval between the maximum value and the minimum value is rendered the dynamic range DR and quantization threshold values uniformly dividing DR are set. These are referred to as quantization reference values.

FIG. 6 illustrates the quantization procedure in which the interval from the maximum value to the minimum value is divided in four and representative values are normally calculated as averages of the respective quantization threshold values.

The decoding is performed with respect to the maximum value, the minimum and the quantization results of the respective pixels. An expression by 2 bits is given to the quantization results of the respective pixels according to FIG. 6. Instead of the maximum value and the minimum value either one of the maximum value and the minimum and the dynamic range DR may be coded.

When 8 bits data of 8 pixels×8 pixels is expressed by 8 bits of the maximum value and the minimum value and 2 bits of the quantization results, the compression rate is 9/32. Incidentally, according to this coding the scanning is necessary only for calculating the maximum value and the minimum value and therefore, there is no problem of scan-transformation although the problem of optimizing the blocking remains.

This data can be decoded by the maximum value and the minimum value (or data corresponding thereto) and the quantization results of necessary pixels. In the meantime, according to the way of calculation whereby the difference in respect of the prediction value derived from the contiguous pixel is calculated, it is necessary for decoding one pixel to decode all of the data which have been scanned prior to the decoding of the one pixel and when the operation is used in the motion compensating prediction necessitating the reading of an arbitrary position, the control of the memory is complicated. However, in such a case, the quantization results for the respective pixels depend only on the maximum value and the minimum value (or data corresponding thereto) and therefore, the reading control of the memory is simplified and the access frequency is reduced.

Next, an explanation will be given of a case where the quantization reference values are determined not by determining the quantization reference values directly from the maximum value and the minimum value but through a further processing procedure.

Normally, noises in some forms are often superposed on images. For example, there are noise at CCDs of a video camera and noise that is generated in converting an analog signal into a digital signal. These are random noises and a coding device of a digital image signal transmits a coded bit stream after honestly coding these noise components. Therefore, an image including the noise components is decoded as a result of decoding the bit stream. However, the maximum value or the minimum value in the block is influenced by the noises, which adversely influences on the quantization reference values. Therefore, an averaging operation is introduced to calculate the quantization difference values in order to avoid the influence.

For example, when a quantization operation having four representative values is performed, the maximum value in the block is designated by Lmx, the minimum value is designated by Lmn, a maximum representative value is designated by Pmx, a minimum representative value is designated by Pmn, a central quantization reference value is designated by Pa and other reference values are designated by P1 and P2 in a block shown by FIG. 7. In this case Pmx, Pmn, Pa, P1 and P2 are calculated to establish the following relationships. Incidentally, a value of a pixel disposed at a position (i,j) is designated by Xij and a quantization results is designated by Φi.

$$Pmx=(\Sigma Xij)/Nmx$$

where Xij designates a value of a pixel having the value of (3Lmx+Lmn)/4 or more and Nmx is a number of pixels in a block each having a value of (3Lmx+Lmn)/4 or more.

$$Pmn=(\Sigma Xij)/Nmn$$

where Xij designates a value of a pixel having the value of (Lmx+3Lmn)/4 or more and Nmn designates a number of pixels in a block each having a value of (Lmx+3Lmn)/4 or more.

$$LD=Pmx-Pmn$$

$$Pa=(Pmx+Pmn)/2$$

where i, j designate a sort in a block.

{if($Xij \leq P1$) $\Phi ij$=00 elseif($Xij \leq Pa$) $\Phi ij$=01 elseif($Xij \leq P2$) $\Phi ij$=10 else $\Phi ij$=11 }

The coding operation is performed with respect to Φij, Pa and LD.

When certain threshold values are calculated from the maximum value and the minimum value and averages of pixels exceeding these threshold values are calculated in this way, variations of the quantization reference values due to noise are avoided and therefore, the image quality is not adversely influenced thereby. Furthermore, these calculations are constituted by simple calculations based on the calculations of average values and therefore, the operations can be realized by a facilitated circuit structure. Instead of LD a width between the quantization difference values of P2–Pa may be coded. The number of bits for coding can be reduced since P2–Pa is provided with a value of a half or less of LD.

The coding is performed in this way, the coded data is written to the prediction memory 11 and the prediction memory 12 and portions necessary for decoding the motion compensating prediction are read. At this occasion the read data are Pa and Ld (or data corresponding thereto) and the quantization results Φij of necessary pixels.

When the data is read and decoded, the decoding is performed in accordance with the following equations. The decoded results of Φij is designated by Yij.

if($\Phi ij$=00) $Yij=Pa-LD/2$ if($\Phi ij$=01) $Yij=Pa-LD/6$ if($\Phi ij$=10) $Yij=Pa+LD/6$ if($\Phi ij$=11) $Yij=Pa+LD/2$

The decoding is conducted in this way and therefore, the calculation thereof is considerably simplified in comparison with the calculation in coding. Therefore, it is very convenient in the case where two blocks of decoding steps are necessary as in the device of FIG. 1. According to the way of calculating where the difference in respect of the prediction value derived from the contiguous pixel, it is necessary for decoding one pixel to decode all of the data which has been scanned prior to decoding the one pixel and the control of the memory is complicated when it is used in the motion compensating prediction necessitating the reading of an arbitrary position. However, in such a case, the quantization results of the respective pixels are dependent on only the maximum value and the minimum value (or data corresponding thereto) and therefore, the reading control of the memory is simplified and the access frequency is minimized.

Although the above explanation has been given with respect to 8 pixels×8 pixels, the dynamic range or LD is decreased when the operation is performed with respect to a smaller region such as 4 pixels×4 pixels and accordingly, it is preferable since the deterioration of image quality is reduced. That is, it goes without saying that it is not necessary to be particular about the size or the shape of the block and the block may be set freely, for example, the block may be constituted by 8 pixels×2 pixels. Although the area of the block of 8 pixels×2 pixels is the same as that of 4 pixels×4 pixels, the size of the resistor (or memory) in the blocking can be reduced.

Next, an explanation will be given of optimizing the blocking in this case. For example, when one block is constituted by 4 pixels×4 pixels, the DCT blocks can be divided in four in a shape of an aggregated squares as illustrated in FIG. 8. However, if there causes a motion in an interlace scanning image, the correlation of data is lost among the fields and therefore, it is preferable to block the data in the same field. That is, the blocking is performed to constitute 4 pixels×4 pixels in the top field and 4 pixels×4 pixels in the bottom field as shown by FIG. 9. In this way the dynamic range or LD can be reduced even if the image has a motion whereby the data can be coded with extremely small deterioration of image quality.

The blocking may naturally be controlled to switch according to the motion. In that case it is preferable not only to change the way of blocking in accordance with the motion but to code the information of the way of blocking. That is, the field blocking and the frame blocking are constituted to switch by the motion vector and the mode of the DCT blocking and the switching of the blocking means is coded. It goes without saying that this operation is not limited to the blocking of 4 pixels ×4 pixels but 4 pixels×4 pixels and 8 pixels×2 pixels may be switched to each other in order to minimize the value of the dynamic range or LD.

Next, a further countermeasure against deterioration of image will be described. The above-mentioned quantization difference values and representative values are univalently determined from the maximum value and the minimum value, or Pa and LD or values corresponding thereto. When the respective pixels are pertinently distributed, such a quantization or calculation of representative values is appropriate. However, there actually is a deviation in the distribution. For example, in the case where a white line is disposed in a darkish background, the pixels are distributed as illustrated in FIG. 10. In such a case the representative value of the level 00 is changed by the influence of the surrounding of the line. The largest number of pixels are distributed centering on a level designated by a dotted line in respect of the level 00 and the error of the pixels is minimized by selecting the level of the dotted line as a representative value. However, when the quantization reference values or the representative values are determined univalently from the maximum value and the minimum value, or Pa and LD or values corresponding thereto in the distribution, the determination will be performed irrespective of the frequency of the distribution, which may cause a deterioration of image quality such as block distortion etc.

Accordingly, representative values having significant accumulation of error are changed by studying the difference between the representative value of a once quantized result and the original data and the number (00 in this example) of the representative value to be changed, the difference from the original representative value and the new representative value as it is are coded and stored in the prediction memories 18 and 19 along with the data.

Thereby, when the decoder 26 or 27 decodes the data such that the replacement is performed based on the information of the replacement of the representative value and the original representative value (Pa−LD/2) is replaced by a new value in correspondence with the quantization result corresponding to the number of representative value (Φ00 in this example), the decoding can be performed to produce an image having small error thereby the deterioration of image quality can be minimized.

As a criteria for determining the largeness or smallness of error, there are a summation of absolute values of differences from the original data, a summation of squares of the difference and the like either of which may be used. Conversely, an integration of the difference values may be performed for each level instead of the summation of absolute values etc. or an integration may be performed by attaching the original sign to the summation of the squares of the differences based on the way of thinking that the optimization is achieved when the average of errors results in 0.

With respect to the replacement operation of the level of the representative value having large error, a level of the representative value whereby a number of pixels having small error is increased the most may be calculated or an average value of pixels constituting a quantization result which minimizes the error in view of a total of the quantization levels may be calculated.

According to the above explanation decoders 32 and 33 and the deblocking circuits or scan-inverse-transforming circuits 34 and 35 are independently provided with processing circuits at the output sides of the respective prediction memories 18 and 19. However, it goes without saying that when an operation having a speed twice as fast as that of the processing circuits is performed and a time shearing processing is conducted, these processing circuits can be realized by a single circuit.

The explanation has been given of the coding device of a digital image signal and the decoding device of a digital image signal such that they are constituted by circuit blocks. However, these devices may be constituted to utilize devices the operation of which is changeable as in a field programmable gate array (FPGA) or to operate a device by a software program by using a digital signal processor (DSP), or by a software programming using a microcomputer. Further, these devices can naturally constitute a system of a simple television conference when they are incorporated in personal computers.

EMBODIMENT 3

An explanation will be given of Embodiment 3 of the present invention in reference to the drawings. According to Embodiment 3 a coding and decoding device of a digital image signal is constituted by a combination of the coding device as illustrated in FIG. 1 and the decoding device as illustrated in FIG. 11.

According to Embodiment 3, in a combination in which information of a digital image signal is compressed and transmitted by the coding device of a digital image signal shown by FIG. 1 and received data is decompressed and restored to the original data by the decoding device of a digital image signal shown by FIG. 11, information showing what kind of blocking method, what kind of scan-transformation and what kind of coding method (referred to as a memory saving coding method including blocking etc.) are adopted by the blocking circuit or scan-transforming circuit 24 and the coder 25 at the coding device of a digital image signal, is transmitted in addition to the output signals shown in FIG. 1, by multiplexing it to the coded data along with the quantization transforming coefficient etc., the information of the multiplexed memory saving coding method is separated and sent to the blocking circuit or scan-transforming circuit 30 and the coding circuit 31 and an operation thereof is performed to switch the information to the original one.

Through this operation, for example, even if the coding method is changed and optimized at every block, the data can be stored in the memories by using coding methods which are brought into agreement in the coding device and the decoding device. That is, the motion compensating prediction and the decoding thereof are carried out at the difference former 2 and the adder 8 in the coding device and the operation is conducted such that a result the same as that by the decoding is provided at the adder 16 of the decoding device. Therefore, the deterioration of image due to coding and decoding in the motion compensating prediction loop can be minimized.

When the operation is carried out such that the coding method differs at every block under such a constitution, it is preferable that the coding method is stored in the prediction memories 11 and 12 by expressing the coding method also between the coder 25 and the decoders 26 and 27 in the coding device. Similarly, it is preferable that the coding method is stored in the prediction memories 18 and 19 by expressing the coding method also between the coder 31 and the decoders 32 and 33 in the decoding device.

In this case, it is the most pertinent that the coding method of the coder 31 is the same as the transmitted coding method of the coding device.

There are various ways as methods of changing the coding method in accordance with blocks, such as selection of a coding method minimizing a total sum of error in a block in respect of the data before coding that is caused by the coding and decoding operation, selection of a coding method increasing the most the number of pixels in the block making smaller an error in respect of the data before coding that is caused by the coding and decoding operation than a certain threshold value, or a combination of these. Further, with respect to the errors, there are calculating methods such as calculating absolute values of differences, squared values etc. These are changed in accordance with more numerous images and the coding bit rate of the coding device and therefore, it is preferable to select them in accordance with cases.

According to the coding device of a digital image signal in accordance with the first aspect of the present invention, the amount of data to be stored in the prediction memories can be reduced and therefore, it has an effect capable of downsizing the memory capacity. Further, it has an effect of reducing the cost imposed on the memories. Furthermore, it has an effect of reducing the cost of a chip and promoting the yield since the memory capacity can be reduced and accordingly, even if it is mounted on a chip of a LSI along with a group of circuits necessary for the coding device, the area of the chip is reduced. Also, it has an effect of providing the coding device of a digital image signal capable of extracting the motion vector and forming the motion compensating prediction.

According to the coding device of a digital image signal in accordance with the second aspect of the present invention, it has an effect capable of reducing the memory capacity since the amount of data to be stored in the prediction memories can be reduced. Further, it has an effect of reducing the cost imposed on the memories. Also, it has an effect of reducing the cost of a chip and promoting the yield since the memory capacity can be reduced and accordingly, even if it is mounted on a chip of a LSI along with a group of circuits necessary for the coding device, the area of the chip can be reduced. It has an effect that the coding device of a digital image signal capable of extracting the motion vector and forming the motion compensating prediction can be provided under the above-mentioned constitution. Furthermore, it has an effect capable of performing accurately the time axis control of the total of the device since the processing is started earlier in consideration of the amount of the processing time. This amounts to promoting the processing accuracy in respect of the time stamp.

According to the coding device of a digital image signal in accordance with the third aspect of the present invention, it has an effect capable of reducing the memory capacity since the amount of data to be stored in the prediction memories can be reduced. Further, it has an effect of reducing the cost imposed on the memories. Also, it has an effect of reducing the cost of a chip and promoting the yield since the memory capacity can be reduced and accordingly, even if it is mounted on a chip of a LSI along with a group of circuits necessary for the coding device, the area of the chip can be reduced. Furthermore, it has an effect of simplifying the memory control since the data arrangement similar to the raster arrangement of video input can be constituted. It has an effect that the coding device of a digital image signal capable of extracting the motion vector and performing the motion compensating prediction can be provided under such a constitution.

According to the coding device of a digital image signal in accordance with the fourth aspect of the present invention, it has an effect capable of realizing the device by small-scaled circuits or small-scaled softwares since the coding is carried out such that the difference value in respect of the prediction value calculated from the contiguous pixel in a block is quantized. Further, it has an effect of halving the memory capacity since the compression rate at this time can be reduced to an approximately half thereof.

According to the coding device of a digital image signal in accordance with the fifth aspect of the present invention, the degree of concentration of the values of data is promoted by selecting the contiguous pixels at positions in a screen which are the most proximate in view of space and time. As a result, it has an effect of further decreasing the degree of deterioration of image with almost no increase in the scale.

According to the coding device of a digital image signal in accordance with the sixth aspect of the present invention, the blocking is conducted, the dynamic range is calculated and the quantization is allocated in the range. Therefore, it becomes possible to set quantization levels saving wasteful quantization outside of the dynamic range whereby it has an effect capable of further decreasing information to be stored in memories since almost no deterioration is caused by conducting a further coarse quantization. Also, it has an effect of minimizing the deterioration of image quality with the same compression rate. Furthermore, it has an effect of significantly simplifying the memory control.

According to the coding device of a digital image signal in accordance with the seventh aspect of the present invention, the blocking is performed and the quantization is allocated in accordance with the distribution of data and therefore, it has an effect in which the quantization levels are difficult to vary in respect of noise. Thereby, it has an effect of reducing the deterioration of image due to noise.

Furthermore, the quantization levels can be set by saving wasteful quantization outside of the distribution whereby it has an effect in which almost no deterioration of image quality is resulted even with a further coarse quantization. Furthermore, it has an effect of significantly simplifying the memory control.

According to the coding device of a digital image signal in accordance with the eighth aspect of the present invention, it has an effect of further decreasing the degree of deterioration of image quality since the degree of concentration of the value of data is enhanced because blocks are selected at positions in a screen where they are the most proximate in the space within the same time. Furthermore, there causes almost no increase in the scale. Yet, the scale remains unincreased at this time.

According to the coding device of a digital image signal in accordance with the ninth aspect of the present invention, the error of quantization is extremely decreased even by the decoding operation by using the means of calculating the quantization levels enlarging the error at the quantization levels and coding the representative values. That is, it has an effect of promoting the accuracy of the levels of the representative values in decoding. Furthermore, thereby, it has an effect of further reducing the degree of deterioration of image quality by the coding and decoding operation.

According to the decoding device of a digital image signal in accordance with the tenth aspect of the present invention, the amount of data to be stored in the prediction memories can be reduced and therefore, it has an effect capable of reducing the memory capacity. Further, it has an effect of reducing the cost imposed on the memory. Furthermore, it has an effect of reducing the cost of a chip and promoting the yield since the memory capacity can be reduced and accordingly, even if it is mounted on a chip of a LSI along with a group of circuits necessary for the coding device, the area of the chip can be reduced. It has an effect that the decoding device of a digital image signal capable of decoding the motion compensating prediction can be provided even under such a constitution.

According to the decoding device of a digital image signal in accordance with the eleventh aspect of the present invention, the amount of data to be stored in the prediction memories can be reduced and therefore, it has an effect capable of reducing the memory capacity. Further, it has an effect of reducing the cost imposed on the memory. Furthermore, it has an effect of reducing the cost of a chip and promoting the yield since the memory capacity is reduced and therefore, even if it is mounted on a chip of a LSI along with a group of circuits necessary for the coding device, the area of the chip can be reduced. It has an effect that the decoding device of a digital image signal capable of decoding the motion compensating prediction can be provided even under such a constitution. Furthermore, it has an effect capable of accurately performing the time axis control of the total of the device since the processing is started earlier in consideration of the amount of the processing time. This amounts to promoting the processing accuracy with respect of the time stamp.

According to the decoding device of a digital image signal in accordance with the twelfth aspect of the present invention, it has an effect capable of reducing the memory capacity since the amount of data to be stored in the prediction memories can be reduced. Further, it has an effect of reducing the cost imposed on the memory. Furthermore, it has an effect of reducing the cost of a chip and promoting the yield since the memory can be reduced and accordingly, even if it is mounted on a chip of a LSI along with a group of circuits necessary for the decoding device, the area of the chip can be reduced. Furthermore, the data arrangement similar to the raster arrangement of video input can be constituted and therefore, it has an effect capable of simplifying the memory control. It has an effect that the decoding device of a digital image signal capable of decoding the motion compensating prediction can be provided even under such a constitution.

According to the decoding device of a digital image signal in accordance with the thirteenth aspect of the present invention, the coding is performed such that the difference value in respect of the prediction value calculated from the contiguous pixel in a block is quantized and therefore, it has an effect capable of realizing the device by small-scaled circuits or small-scaled softwares. Also, it has an effect of halving the memory capacity since the compression rate at that time can be reduced to approximately a half thereof.

According to the decoding device of a digital image signal in accordance with the fourteenth aspect of the present invention, the contiguous pixels are selected at positions of a screen where they are the most proximate in view of space and time and therefore, the degree of concentration of values of data is enhanced. As a result, it has an effect of further reducing the degree of deterioration of image quality on a monitor in outputting the data from the decoding device.

According to the decoding device of a digital image signal in accordance with the fifteenth aspect of the present invention, the blocking is performed, the dynamic range is calculated and the quantization is allocated in the range and therefore, the setting of quantization levels saving wasteful quantization outside of the dynamic range can be performed whereby almost no deterioration is resulted even with a further coarse quantization and therefore, it has an effect capable of further reducing information to be stored in the memories. Also, it has an effect of reducing the deterioration of image quality on a monitor in outputting the data from the decoding device with the same compression rate. Additionally, it has an effect of significantly simplifying the memory control.

According to the decoding device of a digital image signal in accordance with the sixteenth aspect of the present invention, the blocking is performed and the quantization is allocated in accordance with the distribution of the data and therefore, it has an effect in which the quantization levels are difficult to vary in respect of noise. Thereby, it has an effect of reducing the deterioration of image quality due to noise. Also, the setting of the quantization levels saving wasteful quantization outside of the distribution can be conducted whereby it has an effect of almost dispensing with the deterioration of image quality on a monitor in outputting the data from the decoding device even if a further coarse quantization is carried out. Additionally, it has an effect of significantly simplifying the memory control.

According to the decoding device of a digital image signal in accordance with the seventeenth aspect of the present invention, the blocks are selected at positions of a screen where they are the most proximate in the space within the same time whereby the degree of concentration of the values of the data is enhanced and accordingly, it has an effect of further reducing the degree of deterioration of image quality on a monitor in outputting the data from the decoding device. Yet, the scale remains unincreased at this time.

According to the decoding device of a digital image signal in accordance with the eighteenth aspect of the present invention, the error of quantization is extremely reduced even with the decoding operation by the means of calculating the quantization levels enlarging error at the quantization levels and coding the representative values. That is, it has an effect of promoting the accuracy of the levels of the representative values in decoding. Further, it has an effect of further reducing the degree of deterioration of image quality on a monitor in outputting the data from the decoding device.

According to the coding and decoding device of a digital of the present invention image signal in accordance with the nineteenth aspect, the way of using the prediction memories in coding information source utilizing the bidirectional prediction of image signals and the DCT transformation, is transmitted as information and is utilized on the side of decoding whereby the operation is conducted in the manner totally the same both on the coding and decoding sides. It has an effect capable of saving the amount of memories under a state where the deterioration is extremely reduced as a result of the coding and decoding operation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A coding device for digital image signal coding a digital image signal by using a bidirectional motion compensating prediction and a DCT (digital cosine transform) transformation, said coding device comprising:

means for inputting a block of decoded transform coefficients, wherein the block of decoded transform coefficients previously encoded a reference image using DCT and bidirectional prediction;

means for blocking the block of decoded transform coefficients from said input means;

means for coding the blocked data;

means for writing the coded data to a prediction memory;

means for reading reference regions for calculating a motion vector for prediction or data of the reference regions for calculating a prediction value from the prediction memory;

means for decoding the read data and;

means for deblocking the decoded data.

2. The coding device of a digital image signal according to claim 1, wherein the means for coding the blocked data comprises:

means for calculating the prediction value at least from a contiguous pixel;

means for calculating a difference from the prediction value; and means for quantizing the difference.

3. The coding device of a digital image signal according to claim 1, wherein the means for coding the blocked data comprises:

means for calculating the prediction value at least from a contiguous pixel;

means for calculating a difference from the prediction value; and means for quantizing the difference;

wherein the prediction value is referred to by a spatially proximate contiguous pixel in a same field.

4. The coding device of a digital image signal according to claim 1, wherein the means for coding the blocked data comprises:

means for calculating a dynamic range based on a maximum value and a minimum value of values of pixels in a block;

means for calculating reference values from the dynamic range; and means for quantizing the data in accordance with the reference values.

5. The coding device of a digital image signal according to claim 4, wherein the blocking means blocks the data in a same field in blocking the data.

6. The coding device of a digital image signal according to claim 4, wherein the means for coding the blocked data quantizes the data by calculating the quantization reference values from the values of the pixels in the block, wherein if an error between a value of the data before quantizing the data and a value thereof quantized and transformed into a representative value is large, the representative value is replaced by a representative value reducing the error.

7. The coding device of a digital image signal according to claim 1, wherein the means for decoding the blocked data comprises:

means for calculating quantization reference values from a distribution of values of pixels in a block;

means for coding among the quantization reference values one level thereof;

means for coding a quantization width information; and means for quantizing the data in accordance with the quantization reference values.

8. A coding device for digital image signal coding a digital image signal by using a bidirectional motion compensating prediction and a DCT transformation, multiplexing in respect of time axes the digital image signal along with compressed data of a digital audio signal and multiplexing and coding respective time axes data of the image signal and the audio signal in multiplexing the digital signals, said coding device comprising:

means for inputting a block of decoded transform coefficients, wherein the block of decoded transform coefficients previously encoded a reference image using DCT and bidirectional prediction;

means for blocking the block of decoded transform coefficients from said input means;

means for coding the blocked data;

means for writing the coded data to a prediction memory;

means for reading reference regions for calculating a motion vector for prediction or data of the reference regions for calculating a prediction value from the prediction memory; and means for decoding the read data;

said reading means reads the reference regions or the data of the reference regions prior to a predetermined time point by a processing time period to be in alignment with the multiplexed time axes data.

9. A coding device for digital image signal coding a digital image signal by using a bidirectional motion compensating prediction and a DCT transformation, said coding device comprising:

means for inputting a block of decoded transform coefficients, wherein the block of decoded transform coefficients previously encoded a reference image using DCT and bidirectional prediction;

means for raster-transforming the block of decoded transform coefficients from said input means;

means for coding the raster-transformed data;

means for writing the coded data to a prediction memory;

means for reading the reference regions for calculating a motion vector for prediction or data of the reference regions for calculating a prediction value from the prediction memory;

means for decoding the read data; and means for deblocking the decoded data.

10. A decoding device for digital image signal decoding an information-compressed data formed by coding a digital image signal by using a bidirectional motion compensating prediction and a DCT transformation, said decoding device comprising:

means for inputting a block of decoded transform coefficients, wherein the block of decoded transform coefficients previously encoded a reference image using DCT and bidirectional prediction;

means for blocking the block of decoded transform coefficients from said input means;

means for coding the blocked data;

means for writing the coded data to a prediction memory;

means for reading the data from the prediction memory for decoding a difference from a prediction value;

means for decoding the read data;

means for deblocking the decoded data; and means for decoding the difference value from the prediction value by using the deblocked, decoded data.

11. The decoding device of a digital image signal according to claim 10, wherein the means for coding the blocked data comprises:

means for calculating the prediction value at least from a contiguous pixel;

means for calculating a difference from the prediction value; and means for quantizing the difference.

12. The decoding device of a digital image signal according to claim 10, wherein the means for coding the blocked data comprises:

means for calculating the prediction value at least from a contiguous pixel;

means for calculating a difference from the prediction value;

means for quantizing the difference; and wherein the prediction value is referred to by a spatially proximate pixel in a same field.

13. The decoding device of a digital image signal according to claim 10, wherein the means for coding the blocked data comprises:

means for calculating a dynamic range based on a maximum value and a minimum value of values of pixels in a block;

means for calculating reference values from the dynamic range; and means for quantizing the data in accordance with the reference values.

14. The coding device of a digital image signal according to claim 13, wherein the blocking means blocks the data in a same field in blocking the data.

15. The decoding device of a digital image signal according to claim 13, wherein the means for coding the blocked data quantizes the data by calculating the quantization reference values from the values of the pixels in the block, wherein if an error between a value of the data before quantizing the data and a value thereof quantized and transformed into a representative value is large, the representative value is replaced by a representative value reducing the error.

16. The decoding device of a digital image signal according to claim 10, wherein the means for coding the blocked data comprises:

means for calculating quantization reference values from a distribution of values of pixels in a block;

means for coding among the quantizing reference values one level thereof;

means for coding a quantization width information; and means for quantizing the data in accordance with the quantization reference values.

17. A decoding device for digital image signal of data formed by coding a digital image signal by using a bidirectional motion compensating prediction and a DCT transformation, multiplexing in respect of time axes the digital image signal along with compressed data of a digital audio signal and multiplexing respective time axes data of image and audio signals in multiplexing the digital signals such that the image and the audio signals are synchronized with each other based on the time axes data, said decoding device comprising:

means for inputting a block of decoded transform coefficients, wherein the block of decoded transform coefficients previously encoded a reference image using DCT and bidirectional prediction; means for blocking the block of decoded transform coefficients from said input means;

means for coding the blocked data;

means for writing the coded data to a prediction memory;

means for reading the data from the prediction memory to decode a difference value from a prediction value;

means for decoding the read data; and means for decoding the difference value from the prediction value by using the decoded data, said reading means reads the data prior to a predetermined time point by a processing time period to be in alignment with the multiplexed time axes data.

18. A decoding device for digital image signal decoding an information-compressed data formed by coding a digital image signal by using a bidirectional motion compensating prediction and a DCT transformation, said decoding device comprising:

means for inputting a block of decoded transform coefficients, wherein the block of decoded transform coefficients previously encoded a reference image using DCT and bidirectional prediction; means for raster-transforming the block of decoded transform coefficients from said input means;

means for coding the raster-transformed data;

means for writing the coded data to a prediction memory;

means for reading the data from the prediction memory to decode a difference value from a prediction value;

means for decoding the read data;

means for deblocking the decoded data; and means for decoding the difference value from the prediction value by using the deblocked, decoded data.

19. A coding and decoding device of a digital image signal coding a digital image signal by using a bidirectional motion compensating prediction and a DCT transformation, said coding and decoding device comprising:

means for inputting a block of decoded transform coefficients, wherein the block of decoded transform coefficients previously encoded a reference image using DCT and bidirectional prediction;

means for blocking the block of decoded transform coefficients from said input means;

means for coding the blocked data;

means for writing the coded data to a prediction memory;

means for reading reference regions for calculating a motion vector for prediction or data of the reference regions for calculating a prediction value from the prediction memory;

means for decoding the read data;

means for deblocking the decoded data;

means for adding an information indicating a method adopted by the means for coding the blocked data at this time;

means for inputting after transmission reference images for decoding images for the bidirectional prediction to a spatial region as data and blocking the data based on the information indicating the method of coding the blocked data;

means for coding the blocked data;

means for writing the coded data to a prediction memory;

means for reading the data from the prediction memory to decode a difference value from a prediction value;

means for decoding the read data;

means for deblocking the decoded data; and means for decoding the difference value from the prediction value by using the deblocked, decoded data.

* * * * *